(12) United States Patent
Kashiwabara et al.

(10) Patent No.: US 12,174,040 B2
(45) Date of Patent: Dec. 24, 2024

(54) MAP DATA USAGE SYSTEM, MAP DATA USAGE METHOD, AND PROGRAM

(71) Applicant: TOYOTA JIDOSHA KABUSHIKI KAISHA, Toyota (JP)

(72) Inventors: Kenjiro Kashiwabara, Toyota (JP); Yasuyuki Mikami, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 17/648,982

(22) Filed: Jan. 26, 2022

(65) Prior Publication Data

US 2022/0282988 A1 Sep. 8, 2022

(30) Foreign Application Priority Data

Mar. 3, 2021 (JP) ................. 2021-033520

(51) Int. Cl.
*G01C 21/00* (2006.01)
(52) U.S. Cl.
CPC ....... *G01C 21/387* (2020.08); *G01C 21/3896* (2020.08)
(58) Field of Classification Search
CPC ............. G01C 21/387; G01C 21/3896; B60W 2556/30; B60W 2556/45; B60W 50/00; B60W 2050/0001; B60R 16/0231
USPC ........................................ 701/450
See application file for complete search history.

(56) References Cited

U.S. PATENT DOCUMENTS

| 2020/0322571 | A1* | 10/2020 | Awai .................. H04N 7/04 |
| 2021/0039676 | A1* | 2/2021 | Lee .................. G01C 21/3407 |
| 2021/0199463 | A1* | 7/2021 | Kitahara ............ G01C 21/3815 |
| 2022/0139217 | A1* | 5/2022 | Lin .................. G06V 20/52 |
| | | | 340/937 |
| 2022/0222060 | A1* | 7/2022 | Chikamori ......... G01C 21/3889 |

FOREIGN PATENT DOCUMENTS

| JP | 2015001471 A | 1/2015 |
| JP | 2022108087 A | 7/2022 |

* cited by examiner

*Primary Examiner* — Marc Burgess
*Assistant Examiner* — John D Holman
(74) *Attorney, Agent, or Firm* — Dickinson Wright, PLLC

(57) ABSTRACT

A system includes: a server configured to transmit map data of each of areas; and a vehicle including a storage device. In a case where map data of an area to which a current position of the vehicle belongs is not stored in the storage device, the vehicle transmits, to the server, an acquisition request to acquire map data of an acquisition area including at least the area and stores the map data of the acquisition area that is transmitted in response to the acquisition request in the storage device. In a case where a frequency index value is equal to or less than a predetermined threshold, when a predetermined condition is established, the vehicle deletes the map data of the acquisition area. In a case where the frequency index value is larger than the threshold, the vehicle maintains the map data of the acquisition area to be stored.

11 Claims, 12 Drawing Sheets

MAP DATA USAGE SYSTEM, MAP DATA USAGE METHOD, AND PROGRAM

CROSS-REFERENCE TO RELATED APPLICATION

This application claims priority to Japanese Patent Application No. 2021-033520 filed on Mar. 3, 2021, incorporated herein by reference in its entirety.

BACKGROUND

1. Technical Field

The present disclosure relates to a map data usage system including a map data distribution server configured to transmit map data of each of a plurality of areas, and a vehicle configured to acquire map data from the map data distribution server and execute a predetermined vehicle control based on the map data thus acquired. Furthermore, the present disclosure relates to a map data usage method for executing a vehicle control based on map data acquired from a map data distribution server, and a program for acquiring map data from a map data distribution server.

2. Description of Related Art

In the related art, there has been known a map data usage system including a server configured to transmit map data to a vehicle, and a vehicle configured to execute a vehicle control based on the map data transmitted from the server. For example, in a map data usage system (hereinafter referred to as a "conventional system") described in Japanese Unexamined Patent Application Publication No. 2015-1471 (JP 2015-1471 A), in a case where it is necessary to update map data stored in a storage device of a vehicle to latest map data, the vehicle acquires, from a server, pieces of latest map data of a first area where the vehicle runs frequently, an area adjacent to the first area, and a second area where the vehicle does not frequently run sequentially in this order.

SUMMARY

In the vehicle, the pieces of map data acquired from the server are stored in the storage device provided in the vehicle. In recent years, the accuracy of map data has been increased. Because of this, the data quantity of map data is large, and therefore, the vehicle requires a storage device with a large memory capacity. However, the storage device with a large memory capacity involves costs, and this cause such a problem that the manufacturing cost of the vehicle increases.

The present disclosure is achieved to deal with the above problem. That is, one object of the present disclosure is to provide a map data usage system that can reduce a memory capacity required for a storage device by reducing a use capacity of map data to be stored in a storage device of a vehicle.

A map data usage system of the present disclosure (hereinafter also referred to as "the system according to the present disclosure") is a map data usage system including a map data distribution server (20) and a vehicle (VA). The map data distribution server is configured to transmit map data of each of a plurality of areas having a predetermined magnitude. The vehicle includes a storage device (36) in which the map data transmitted from the map data distribution server via a network (NW) is stored, a position acquisition device (38) configured to acquire a current position, and a control device (30 and 60) configured to execute a predetermined vehicle control by use of the map data stored in the storage device. In a case where the map data distribution server receives an acquisition request for map data that is transmitted from the vehicle, the map data distribution server is configured to transmit, to the vehicle, map data of an area corresponding to the acquisition request thus received. The control device is configured as follows. That is, in a case where, among the areas, map data of an area to which the current position of the vehicle belongs is not stored in the storage device ("No" in step 705), the map data being acquired by the position acquisition device, the control device transmits, to the map data distribution server as the acquisition request, a request to acquire map data of an acquisition area including at least the area to which the current position of the vehicle belongs (step 715 and step 725). The control device receives the map data of the acquisition area that is transmitted from the map data distribution server in response to the acquisition request and then stores the map data in the storage device (step 800 to step 895). In a case where a frequency index value (N) indicative of how frequently the vehicle runs in an area to which a position of the vehicle at a time of transmission of the acquisition request belongs is equal to or less than a predetermined deletion threshold (N2th) ("Yes" in step 740, step 725, "Yes" in step 810, step 815), when a predetermined deletion condition is established, the control device deletes the map data of the acquisition area from the storage device (step 920). In a case where the frequency index value in the area to which the position of the vehicle at the time of transmission of the acquisition request belongs is larger than the deletion threshold ("No" in step 740, step 750, "No" in step 810), the control device maintains the map data of the acquisition area to be stored without deleting the map data of the acquisition area from the storage device regardless of whether the deletion condition is established or not (step 820).

In the system according to the present disclosure, in a case where the frequency index value of the area to which the position of the vehicle at the time of transmission of the acquisition request belongs is equal to or less than the deletion threshold, when the deletion condition is established, the map data transmitted from the map data distribution server in response to the acquisition request is deleted from the storage device. Hereby, the use capacity for the map data stored in the storage device can be reduced, thereby making it possible to reduce a memory capacity required for the storage device. Further, map data of an area the frequency index value of which is larger than the deletion threshold is not deleted from the storage device, so that it is not necessary to acquire the map data of the area from the map data distribution server over and over again. Hereby, the communication traffic between the map data distribution server and the vehicle can be reduced.

In one aspect of the system according to the present disclosure, in a case where a frequency index value (N) in the area to which the current position of the vehicle belongs is larger than a predetermined acquisition threshold (N1th) ("Yes" in step 730), the control device may transmit, to the map data distribution server as the acquisition request, a first acquisition request that is a request to acquire the map data of the area to which the current position of the vehicle belongs (step 735). In a case where the frequency index value in the area to which the current position of the vehicle belongs is equal to or less than the acquisition threshold ("No" in step 730), the control device may transmit, to the map data distribution server as the acquisition request, a second acquisition request to acquire the map data of the area to which the current position of the vehicle belongs and map data of an area adjacent to the area to which the current position of the vehicle belongs (step 715).

In a case where the vehicle enters an area the frequency index value of which is equal to or less than the acquisition threshold (hereinafter referred to as a "low frequency area"), the vehicle is more likely to subsequently pass through an area the map data of which is not stored in the storage device in comparison with a case where the vehicle enters an area the frequency index value of which is larger than the acquisition threshold (hereinafter referred to as a "high frequency area"). This is because, in a case where the vehicle enters the low frequency area, the vehicle is more likely to run toward a destination with a low visit frequency or a destination that the vehicle visits for the first time. In this aspect, in a case where the frequency index value of the area to which the current position of the vehicle belongs is equal to or less than the acquisition threshold, the map data of the area to which the current position of the vehicle belongs and the map data of an area adjacent to the area are acquired. Hereby, even in a case where the vehicle enters a low frequency area and then further enters another low frequency area, it is possible to raise the possibility that the vehicle control is executable based on the map data of an entering area that the vehicle enters without acquiring the map data of the entering area from the map data distribution server.

In the above aspect, in a case where the frequency index value in the area to which the position of the vehicle at the time of transmission of the acquisition request belongs is equal to or less than the predetermined deletion threshold, the control device may be configured such that: when the area to which the current position of the vehicle belongs becomes different from an area to which the position of the vehicle at the time of transmission of the first acquisition request belongs ("No" in step 915), the control device determines that the predetermined deletion condition is established, and the control device deletes, from the storage device, the map data transmitted from the map data distribution server in response to the first acquisition request (step 920); and when the area to which the current position of the vehicle belongs becomes different from either of an area to which the position of the vehicle at the time of transmission of the second acquisition request belongs and an area adjacent to the area to which the position of the vehicle at the time of transmission of the second acquisition request belongs ("No" in step 925), the control device determines that the predetermined deletion condition is established, and the control device deletes, from the storage device, the map data transmitted from the map data distribution server in response to the second acquisition request (step 920).

In a case where the area to which the current position of the vehicle belongs is different from the area to which the position of the vehicle belongs at the time of transmission of the first acquisition request, the map data transmitted from the map data distribution server in response to the first acquisition request is not used. In a case where the area to which the current position of the vehicle belongs is different from either of the area to which the position of the vehicle belongs at the time of transmission of the second acquisition request and the area adjacent to the area to which the position of the vehicle belongs at the time of transmission of the second acquisition request, the map data transmitted from the map data distribution server in response to the second acquisition request is not used. In the present aspect, when the map data is not used, the deletion condition is established, so that the map data is deleted from the storage device. It is possible to efficiently reduce the use capacity for the map data in the storage device.

In one aspect of the system according to the present disclosure, either the number of passing times as the number of times the vehicle passes the area in a predetermined period or a ratio of the number of passing times to the number of driving times of the vehicle in the predetermined period may be acquired as the frequency index value (step 620).

Hereby, the frequency index value indicates a running frequency of the "vehicle" in each area. Accordingly, only map data of an area the frequency index value (indicative of the running frequency of the "vehicle") of which is larger than the deletion threshold is stored in the storage device. Hereby, it is possible to reduce the memory capacity for the map data in the storage device.

In one aspect of the system according to the present disclosure, either the number of passing times as the number of times the vehicle driven by a current driver who is a driver driving the vehicle at present passes through the area in a predetermined period or a ratio of the number of passing times to the number of driving times of the vehicle by the current driver in the predetermined period may be acquired as the frequency index value (step 1115).

Hereby, the frequency index value indicates a running frequency of "each driver" in each area. Accordingly, only map data of an area the frequency index value (indicative of the running frequency of the "driver") of which is larger than the deletion threshold is stored in the storage device. Hereby, it is possible to reduce the memory capacity for the map data in the storage device, thereby making it possible to store, in the storage device, map data corresponding to the running frequency of the driver.

In one aspect of the system according to the present disclosure, a ratio of the number of passing times as the number of times the vehicle driven by a current driver who is a driver driving the vehicle at present passes through the area in a predetermined period to the number of driving times of the vehicle by the current driver in the predetermined period may be acquired as a first frequency index value, and a ratio to the number of passing times as the number of times the vehicle passes through the area in the predetermined period regardless of drivers of the vehicle to the number of driving times of the vehicle in the predetermined period regardless of drivers may be acquired as a second frequency index value. In a case where the first frequency index value in the area to which the current position of the vehicle belongs is larger than the predetermined acquisition threshold ("Yes" in step 1210 illustrated in FIG. 13), the control device may transmit, to the map data distribution server as the acquisition request, a first acquisition request to acquire the map data of the area to which the current position of the vehicle belongs (step 735 illustrated in FIG. 13). In a case where the first frequency index value of the area to which the current position of the vehicle belongs is equal to or less than the acquisition threshold ("No" in step 1210 illustrated in FIG. 13), the control device may transmit, to the map data distribution server as the acquisition request, a second acquisition request to acquire the map data of the area to which the current position of the vehicle belongs and map data of an area adjacent to the area to which the current position of the vehicle belongs (step 715 illustrated in FIG. 13). In a case where the second frequency index value of the area to which the position of the vehicle at the time of transmission of the acquisition request belongs is equal to or less than the deletion threshold ("Yes" in step 1310, step 725 illustrated in FIG. 13, "Yes" in step 810, step 815), when the deletion condition is established, the control device may delete the map data of the acquisition area from the storage device. In a case where the second frequency index value of the area to which the position of the vehicle at the time of transmission of the acquisition request belongs is larger than the deletion threshold ("No" in step 1310, step 750 illustrated in FIG. 13, "No" in step 810), the control device may maintain the map data of the acquisition area to be stored (step 820).

In a case where the vehicle enters a low frequency area where the running frequency of a current driver (the first frequency index value) is equal to or less than the acquisition threshold, the vehicle is more likely to subsequently pass through an area the running frequency of the driver of which is low and the map data of which is not stored in the storage device. In such a case, the map data of the area to which the current position of the vehicle belongs and the map data of the area adjacent to the area are acquired.

Further, in the present aspect, even in a case where the running frequency of the driver (the first frequency index value) is high, the map data of an area where the running frequency of the vehicle (the second frequency index value) is low is deleted from the storage device regardless of drivers. Consequently, it is possible to reduce the memory capacity for the map data in the storage device.

A map data usage method of the present disclosure is a map data usage method for executing a predetermined vehicle control by use of map data stored in a storage device (36) of a vehicle (VA), the map data being transmitted via a network (NW) from a map data distribution server (20) in which map data of each of a plurality of areas having a predetermined magnitude is stored The map data usage method includes: a first step (step 715 and step 725) of, in a case where map data of an area to which a current position of the vehicle belongs is not stored in the storage device ("No" in step 705), transmitting, to the map data distribution server, a request to acquire map data of an acquisition area including at least the area to which the current position of the vehicle belongs; a second step (step 800 to step 895) of receiving the map data of the acquisition area that is transmitted from the map data distribution server in response to the request and storing the map data in the storage device; a third step (step 920) of, in a case where a frequency index value (N) indicative of how frequently the vehicle runs in an area to which a position of the vehicle at the time of transmission of the request belongs is equal to or less than a predetermined deletion threshold (N2th) ("Yes" in step 740, step 725, "Yes" in step 810, step 815), deleting the map data of the acquisition area from the storage device when a predetermined deletion condition is established; and a fourth step (step 820) of, in a case where the frequency index value in the area to which the position of the vehicle at the time of transmission of the request belongs is larger than the deletion threshold ("No" in step 740, step 750, "No" in step 810), maintaining the map data of the acquisition area to be stored without deleting the map data of the acquisition area from the storage device regardless of whether the deletion condition is established or not.

A program according to the present disclosure is a program applied to a vehicle (VA) including a storage device (36) in which map data is stored and configured to execute a predetermined vehicle control by use of the map data stored in the storage device, the map data being transmitted via a network (NW) from a map data distribution server (20) in which map data of each of a plurality of areas having a predetermined magnitude is stored. The program includes: a first step (step 715 and step 725) of, in a case where map data of an area to which a current position of the vehicle belongs is not stored in the storage device ("No" in step 705), transmitting, to the map data distribution server, a request to acquire map data of an acquisition area including at least the area to which the current position of the vehicle belongs; a second step (step 800 to step 895) of receiving the map data of the acquisition area that is transmitted from the map data distribution server in response to the request and storing the map data in the storage device; a third step (step 920) of, in a case where a frequency index value (N) indicative of how frequently the vehicle runs in an area to which a position of the vehicle at the time of transmission of the request belongs is equal to or less than a predetermined deletion threshold (N2th) ("Yes" in step 740, step 725, "Yes" in step 810, step 815), deleting the map data of the acquisition area from the storage device when a predetermined deletion condition is established; and a fourth step (step 820) of, in a case where the frequency index value in the area to which the position of the vehicle at the time of transmission of the request belongs is larger than the deletion threshold ("No" in step 740, step 750, "No" in step 810), maintaining the map data of the acquisition area to be stored without deleting the map data of the acquisition area from the storage device regardless of whether the deletion condition is established or not.

With the map data acquisition method and the program, in a case where the frequency index value in the area to which the position of the vehicle at the time of transmission of the acquisition request belongs is equal to or less than the deletion threshold, when the deletion condition is established, the map data transmitted from the map data distribution server in response to the acquisition request is deleted from the storage device. Hereby, it is possible to reduce the use capacity for the map data stored in the storage device of the vehicle.

Note that, in the above description, in order to help understanding of the disclosure, a name and/or a reference sign used in the following embodiment is given in parenthesis to each constituent of the disclosure corresponding to the following embodiment. However, the each constituent of the disclosure is not limited to the following embodiment defined by the name and/or the reference sign.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
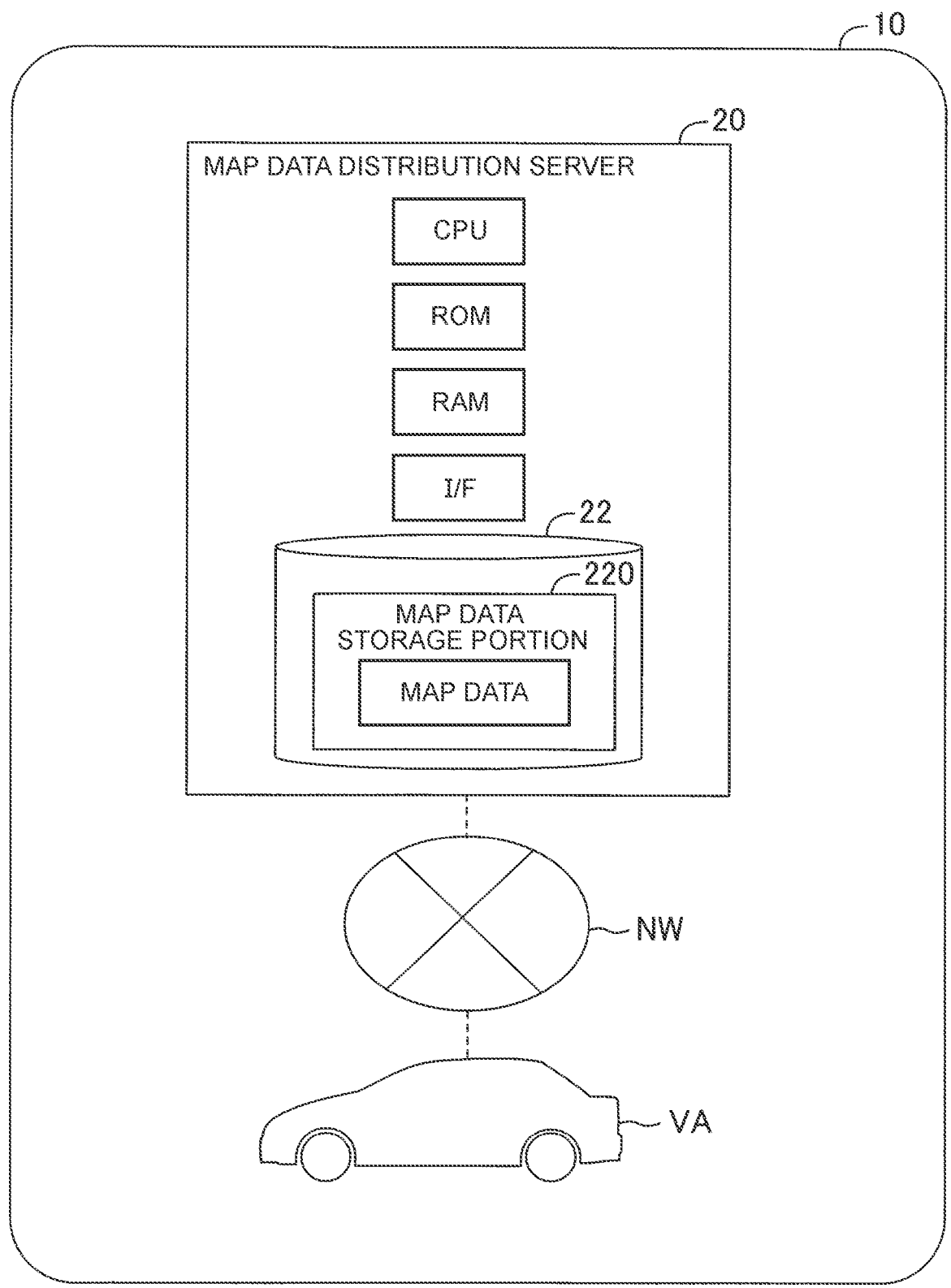
FIG. 1 is a schematic system configuration diagram of a map data usage system according to an embodiment of the present disclosure.

The following describes a map data usage system (hereinafter referred to as the "system") 10 according to an embodiment of the present disclosure with reference to the drawings. As illustrated in FIG. 1, the system 10 includes a map data distribution server 20 and a vehicle VA. Hereinafter, the map data distribution server 20 is referred to as the "distribution server 20." For convenience, FIG. 1 illustrates only one vehicle VA, but the system 10 may include a plurality of vehicles VA. The vehicle VA is connected to the distribution server 20 via a network NW in a data communicable manner.

The distribution server 20 includes a CPU, a ROM, a RAM, an interface (I/F), and a storage device 22. The CPU implements various functions by executing instructions stored in a memory (ROM). The storage device 22 is constituted by a hard disk, for example, and includes a map data storage portion 220 in which map data is stored.

Figure 2:
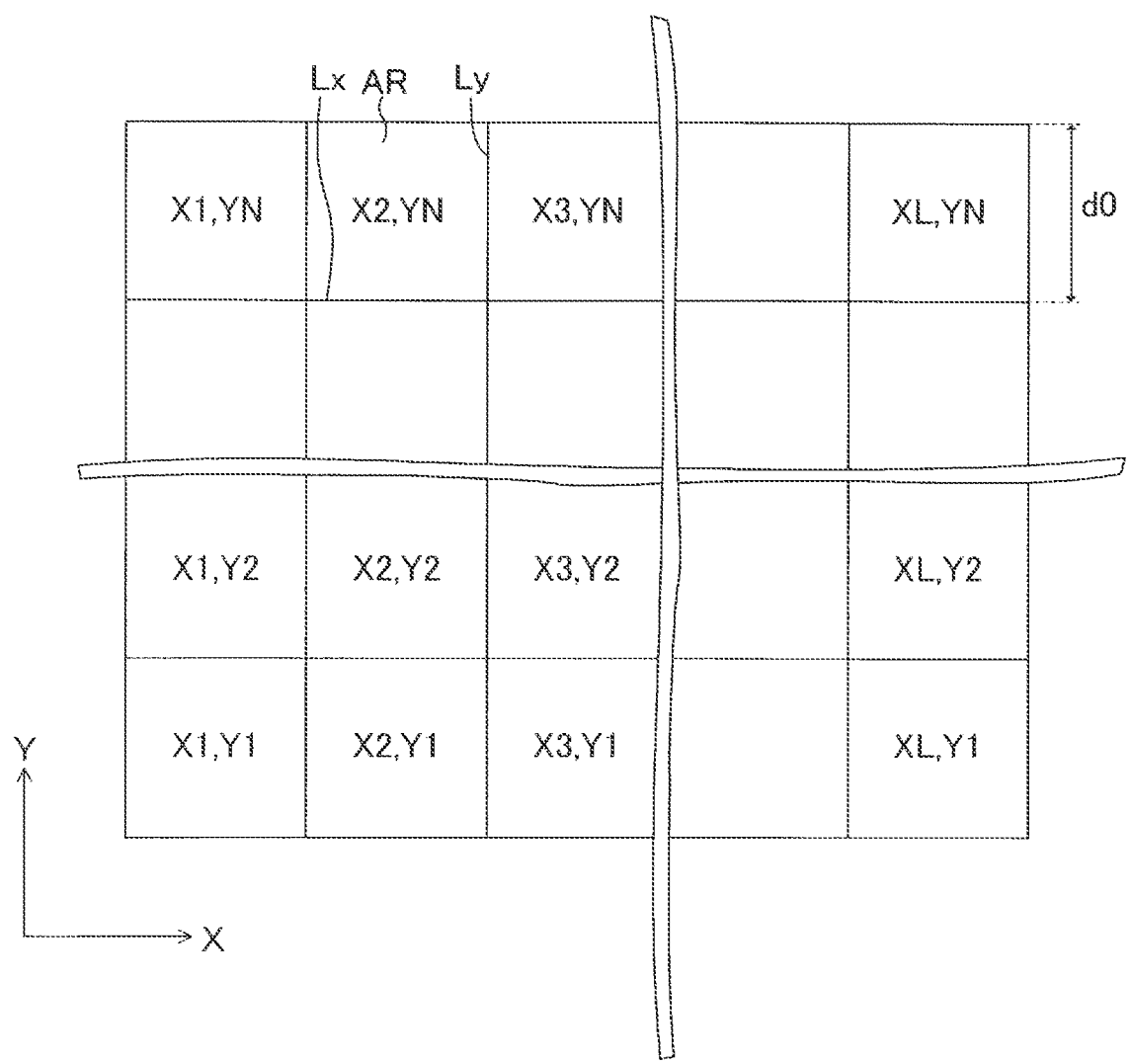
FIG. 2 is an explanatory view of map data.

As illustrated in FIG. 2, the map data is divided into pieces of data each corresponding to each of a plurality of areas AR. The map data is stored in the map data storage portion 220 such that which map data corresponds to which area AR is identifiable. The area AR is defined by a plurality of parallel lines Lx in an X-direction and a plurality of parallel lines Ly in a Y-direction. In the present embodiment, the areas AR are squares having magnitudes equal to each other. As an example, the length of one side of the area AR d0 is 1 km. Note that the shape of the area AR may not be a square.

In the present embodiment, the X-direction faces the east, and the Y-direction is a direction perpendicular to the X-direction (that is, the Y-direction faces the north). Respective positions of the area AR in the X-direction and in the Y-direction are expressed by a value Xk (k=1, 2, 3, . . . L) and a value Ym (m=1, 2, 3, . . . N). One of the areas AR is specified by a data set (Xk,Ym). That is, the data set (Xk,Ym) of the value Xk and the value Ym is an area identifier (area ID) by which the area AR is identifiable uniquely. A range of each of the areas AR is defined by latitude and longitude. Accordingly, when position information specified by a set of a given latitude and a given longitude is provided, one area (Xk,Ym) is determined from among the areas AR.

Figure 3:
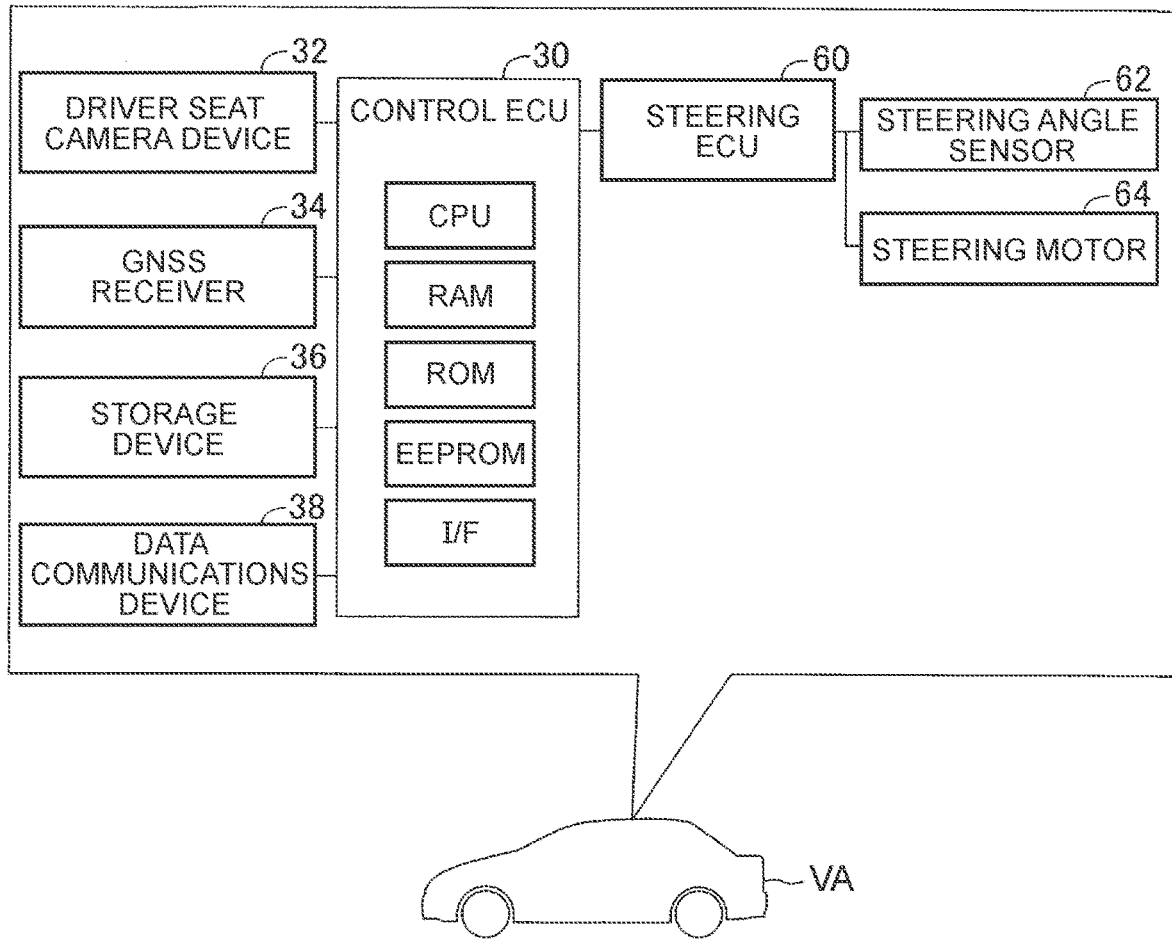
FIG. 3 is a schematic system configuration diagram of a vehicle illustrated in FIG. 1.

As illustrated in FIG. 3, the vehicle VA includes a control ECU 30 and a steering ECU 60. These ECUS are connected to each other via a controller area network (CAN) in a data communicable manner.

The "ECU" is an abbreviation of Electronic Control Unit and is an electronic control circuit including, as a main constituent component, a microcomputer including a CPU, a ROM, a RAM, a rewritable nonvolatile memory (an EEPROM in the present embodiment), an interface, and so on. The ECU may be referred to as a "control device" or a "controller." The CPU implements various functions by executing instructions (a routine) stored in a memory (ROM). The ECU 30 and the ECU 60 may be fully or partially unified as one ECU.

Further, the vehicle VA includes a driver seat camera device 32, a global navigation satellite system (GNSS) receiver 34, a storage device 36, and a data communications device 38. They are connected to the control ECU 30 in a data communicable manner.

The driver seat camera device 32 acquires an image (driver seat image) around a driver seat of the vehicle VA and transmits the driver seat image to the control ECU 30. Note that the driver seat camera device 32 is used in a first modification.

The GNSS receiver 34 receives a "signal (GNSS signal) from an artificial satellite" used to detect a current position (latitude, longitude) of the vehicle VA. In the following description, the GNSS receiver 34 may be also referred to as a "position acquisition device."

Figure 4:
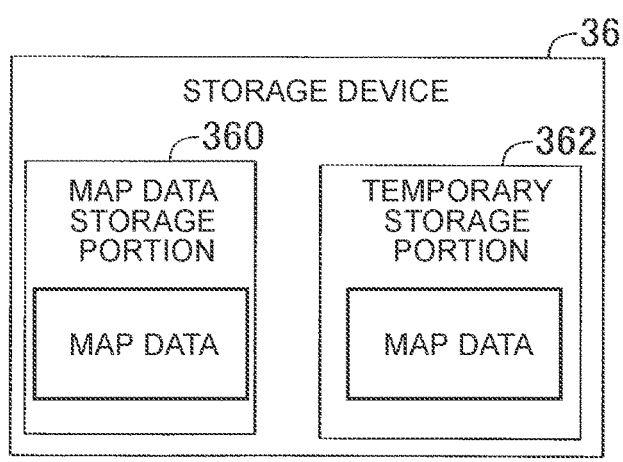
FIG. 4 is an explanatory view of a storage device of the vehicle illustrated in FIG. 3.

The storage device 36 is a device (e.g., a hard disk) including a storage medium in which writing, holding, and reading of data are performable. As illustrated in FIG. 4, the storage device 36 includes a map data storage portion 360 and a temporary storage portion 362. Map data stored in the temporary storage portion 362 is to be deleted when a deletion condition (described later) is established, but map data stored in the map data storage portion 360 is not deleted even when the deletion condition is established.

The data communications device 38 illustrated in FIG. 3 includes a wireless communications device and is configured to exchange data between the control ECU 30 and the distribution server 20.

The steering ECU 60 is a control device for a well-known electric power steering system and is connected to a steering angle sensor 62 and a steering motor 64. The steering motor 64 is incorporated into a "steering mechanism (not illustrated) including a steering wheel, a steering shaft (not illustrated) connected to the steering wheel, a steering gear mechanism, and so on." The steering mechanism is provided in the vehicle VA.

The steering angle sensor 62 detects a steering angle θ of a steered wheel of the vehicle VA and outputs a detection signal indicative of the steering angle θ to the steering ECU 60.

The steering motor 64 generates a torque corresponding to electric power supplied such that the direction, the magnitude, and the like of the electric power are controlled by the steering ECU 60. Due to the torque, a steering assist torque is applied, or right and left steered wheels are steered. That is, the steering ECU 60 can control the steering angle θ by use of the steering motor 64. Note that the electric power is supplied from a battery (not illustrated) provided in the vehicle VA.

The control ECU 30 specifies a current position (a position of the vehicle VA at present) based on the GNSS signal received by the GNSS receiver 34. The control ECU 30 refers to area ID management data stored in the ROM in advance and specifies an area ID (hereinafter referred to as a "current area ID (Xk,Ym)" or a "current area ID") of a current area that is an area corresponding to the current position. In the area ID management data, correspondence of latitude and longitude with Xk and Ym is registered. The control ECU 30 reads out map data (hereinafter referred to as "current map data") corresponding to the current area ID (Xk,Ym) from the storage device 36 and executes a predetermined vehicle control based on the current map data.

Here, one example of the vehicle control to be executed by the control ECU 30 is an automatic steering control. In the automatic steering control, the control ECU 30 controls the steering angle θ such that the vehicle VA runs at a predetermined position around the center, in the width direction, of the lane where vehicle VA is currently running.

More specifically, the control ECU 30 transmits, to the steering ECU 60, a steering command signal including a target steering angle θtgt that causes the vehicle VA to pass through the predetermined position. The steering ECU 60 controls the steering motor 64 such that the steering angle θ coincides with the target steering angle θtgt included in the steering command signal.

Summary of Operation

The control ECU 30 specifies the current position at every predetermined time and specifies the current area ID based on the current position. A current area ID specified at present is referred to as a "latest current area ID," and a current area ID specified a predetermined time before the present time is referred to as a "previous area ID." When the area where the vehicle VA is running is changed to a new area after the previous area ID is specified but before the latest current area ID is specified, the latest current area ID is different from the previous area ID.

In a case where the previous area ID is changed to the latest current area ID, when map data corresponding to the latest current area ID is not stored in the map data storage portion 360, the control ECU 30 transmits, to the distribution server 20 via the data communications device 38, an "acquisition request to acquire map data" including at least the "map data corresponding to the latest current area ID." The acquisition request includes an area ID (hereinafter referred to as a "request area ID") of map data to be acquired by the control ECU 30. In a case where the distribution server 20 receives the acquisition request from the vehicle VA, the distribution server 20 transmits map data corresponding to the area ID included in the acquisition request to the vehicle VA. Note that the area of the map data acquired in response to the acquisition request may be referred to as an "acquisition area."

In the meantime, the control ECU 30 calculates and stores a running frequency N of the vehicle VA in each area during a predetermined period (e.g., three months). More specifically, the control ECU 30 acquires the running frequency N by dividing the number of passing times SN in an area that the vehicle VA has passed during the predetermined period by the number of driving times D of the vehicle during the predetermined period. The number of driving times D is the number of trips counted such that one trip is that an ignition key switch (a switch to allow vehicle running) (not illustrated) of the vehicle VA is changed from an OFF position to an ON position and then changed from the ON position to the OFF position.

When the vehicle VA (the data communications device 38) receives map data from the distribution server 20, the control ECU 30 determines whether the running frequency N in an area corresponding to the latest current area ID is larger than a predetermined deletion threshold or not. In a case where the running frequency N of the area corresponding to the latest current area ID is larger than the predetermined deletion threshold, the control ECU 30 stores the received map data in the map data storage portion 360. On the other hand, in a case where the running frequency N in the area corresponding to the latest current area ID is equal to or less than the predetermined deletion threshold, the control ECU 30 stores the received map data in the temporary storage portion 362. Then, the control ECU 30 reads out, into the RAM, map data stored in either of the map data storage portion 360 and the temporary storage portion 362 and corresponding to the latest current area ID and executes the vehicle control based on the map data thus read out into the RAM.

When the predetermined deletion condition is established, the control ECU 30 deletes the map data stored in the temporary storage portion 362 from the temporary storage portion 362. The deletion condition of the present embodiment includes at least a condition that the latest current area ID is different from an area ID at the time when the acquisition request is transmitted.

Hereby, only map data of an area the running frequency N of which is larger than the deletion threshold is stored in the storage device 36 without being deleted. Accordingly, it is possible to reduce a memory capacity to be use for map data in the storage device 36 in comparison with a case where pieces of map data of all areas are stored in the storage device 36. Further, when the control ECU 30 once acquires map data of an area the running frequency N of which is larger than the deletion threshold, it is not necessary to acquire the map data again. Consequently, it is also possible to reduce a communication traffic from the distribution server 20 to the vehicle VA.

OPERATION EXAMPLE

In a case where the control ECU 30 transmits an acquisition request, when the running frequency N of the area of the latest current area ID is larger than a predetermined acquisition threshold, the control ECU 30 transmits an acquisition request the acquisition request ID of which is the latest current area ID. In the following description, such an acquisition request is referred to as a "first acquisition request."

On the other hand, when the running frequency N is equal to or less than the acquisition threshold, the control ECU 30 transmits an acquisition request the acquisition request ID of which includes the latest current area ID and an "area ID (hereinafter referred to as an "adjacent area ID") of an area adjacent to the current area." In the following description, such an acquisition request is referred to as a "second acquisition request." Which area corresponds to the area adjacent to the current area will be described later.

Note that the acquisition threshold is set to a value smaller than the deletion threshold. In the following description, the acquisition threshold is referred to as a "first threshold N1th" and the deletion threshold is referred to as a "second threshold N2th" (N1th<N2th).

From the relationship of the running frequency in each area with each of the first threshold N1th and the second threshold N2th, the each area is sorted to any of a first area, a second area, and a third area as described below.

First Area: an area the running frequency N of which is equal to or less than the first threshold N1th (N≤N1th).

Second Area: an area the running frequency N of which is larger than the first threshold N1th but equal to or less than the second threshold N2th (N1th<N≤N2th).

Third Area: an area the running frequency N is larger than the second threshold N2th (N2th<N).

Figure 5:
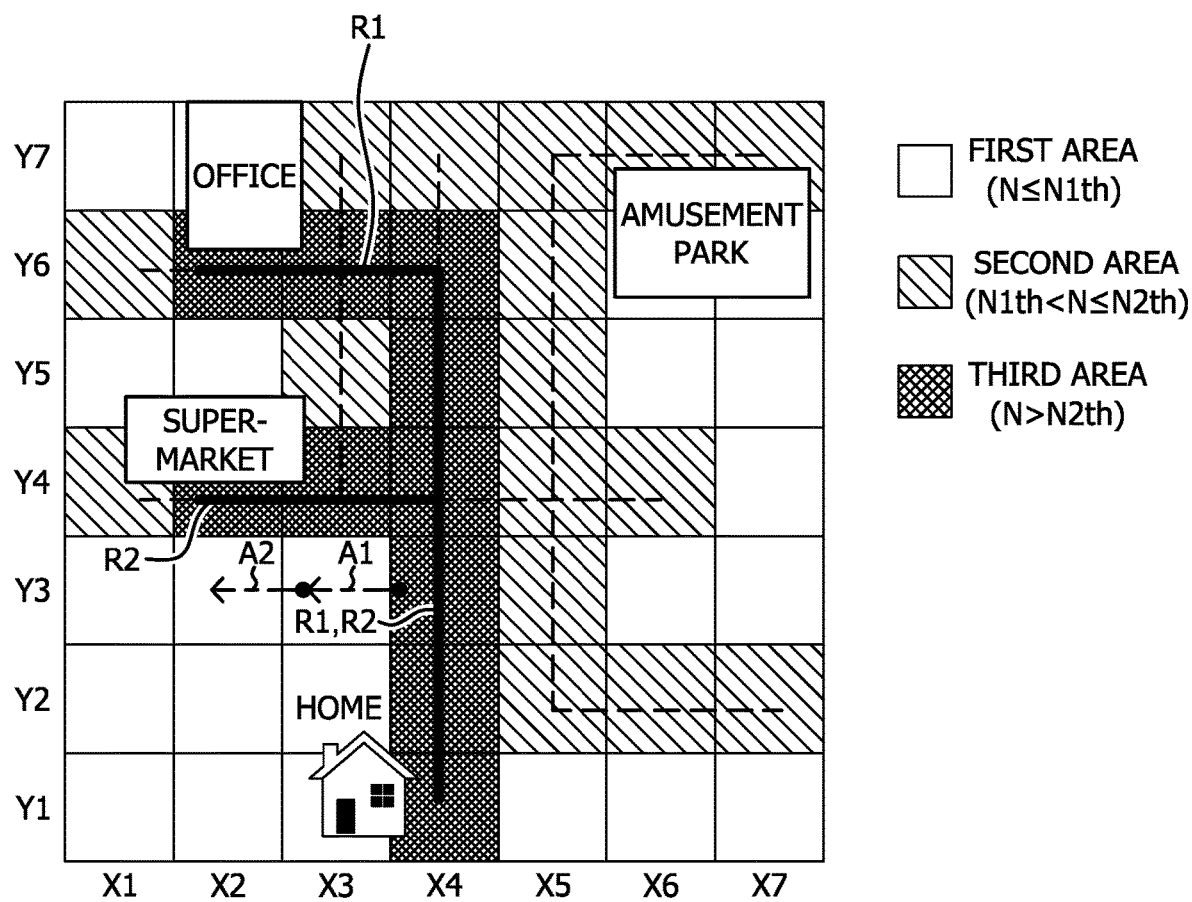
FIG. 5 is an explanatory view of a running frequency in each area.

In the example illustrated in FIG. 5, the first area is a white area without any painting, the second area is an area with hatching, and the third area is an area filled with dark color.

In the example illustrated in FIG. 5, areas through which two routes R1 and R2 indicated by a thick line pass correspond to the third area. The route R1 is a route from home to an office, and the route R2 is a route from home to a supermarket. The route R1 and the route R2 are along the same route from home to a given point at which the route branches off into the route R1 and the route R2. When the vehicle VA passes through these areas and the running frequencies in the areas become larger than the second threshold (that is, when the areas become the third area), pieces of map data of the areas that are received from the distribution server 20 are stored in the map data storage portion 360.

After that, when the vehicle VA enters the third areas, the control ECU 30 does not need to acquire pieces of map data of the third areas from the distribution server 20 because the pieces of map data are stored in the map data storage portion 360. Hereby, it is not necessary to acquire map data of an area on a route with a high running frequency like the routes R1 and R2 from the distribution server 20. As a result, it is possible to reduce the communication traffic between the vehicle VA and the distribution server 20.

In a case where the vehicle VA enters the second area, when map data of the second area is not stored in the temporary storage portion 362, the control ECU 30 transmits the first acquisition request to the distribution server 20. In a case where the vehicle VA enters the first area, when map data of the first area is not stored in the temporary storage portion 362, the control ECU 30 transmits the second acquisition request to the distribution server 20.

As indicated by an arrow A1 in FIG. 5, in a case where the vehicle VA enters a first area (X3,Y3) from a third area (X4,Y3), map data of the first area (X3,Y3) is not stored in either of the map data storage portion 360 and the temporary storage portion 362. In this case, the control ECU 30 transmits, to the distribution server 20, the second acquisition request including, as the acquisition request ID, an ID of the "first area (X3,Y3) that the vehicle VA has entered" and IDS of "adjacent areas described below."

Adjacent Areas: (X2,Y2), (X2,Y3), (X3,Y2), and (X4,Y2)

The adjacent areas indicate areas which are adjacent to the area (X3,Y3) that the vehicle VA has entered and which are placed to surround the area (X3,Y3), but the areas do not include an area (X4,Y3) where the vehicle VA is positioned before the vehicle VA enters the area (X3,Y3) and areas ((X2,Y4), (X3,Y4), and (X4,Y4)) the map data of which is stored by the vehicle VA in the map data storage portion 360.

When the control ECU 30 receives pieces of map data of these areas, the control ECU 30 stores the pieces of map data in the temporary storage portion 362.

After that, as indicated by an arrow A2, in a case where the vehicle VA enters a first area (X2,Y3) from the first area (X3,Y3), map data of the first area (X2,Y3) has been stored in the temporary storage portion 362. In this case, the control ECU 30 does not transmit either of the first acquisition request and the second acquisition request.

In a case where the vehicle VA enters the first area, the vehicle VA is more likely to run toward a destination with a low visit frequency or a destination that the vehicle VA visit for the first time, in comparison with a case where the vehicle VA enters either of the second area and the third area. Accordingly, the vehicle VA is more likely to enter an "area the map data of which is not stored in either of the map data storage portion 360 and the temporary storage portion 362" after the vehicle VA enters the first area. Accordingly, when the vehicle VA enters the first area, the control ECU 30 also acquires pieces of map data of adjacent areas in advance. Hereby, even when the vehicle VA enters an adjacent area adjacent to the first area just after the vehicle VA has entered the first area, the vehicle control is immediately executed based on the map data of the adjacent area.

Specific Operations

Map Data Management Routine

The CPU of the control ECU 30 (hereinafter, the "CPU" indicates the CPU of the control ECU 30 unless otherwise specified) executes a map data management routine illustrated in the flowchart of FIG. 6 at every predetermined time. This routine is a map data management program stored in the ROM of the control ECU 30.

Accordingly, when a predetermined timing comes, the CPU starts processes from step 600 in FIG. 6 and sequentially executes processes of "step 605 to step 615" described below.

Step 605: the CPU acquires the current position of the vehicle VA based on the GNSS signal received by the GNSS receiver 34.

Step 610: the CPU refers to area ID management data and specifies a current area ID corresponding to the current position as a latest current area ID.

Step 615: the CPU determines whether the latest current area ID is the same as a previous area ID or not. Note that the previous area ID is a latest current area ID acquired at the time when this routine is executed previously (a predetermined time before) (see step 635 (described later)).

In a case where the latest current area ID is different from the previous area ID (that is, in a case where the vehicle VA enters an area different from an area corresponding to the previous area ID), the CPU determines "No" in step 615 and sequentially executes processes of "step 620 to step 635" (described later).

Step 620: the CPU acquires a running frequency N in an area (hereinafter referred to as a "current area") specified by the latest current area ID.

More specifically, the CPU adds "1" to the "number of passing times SN in the current area" stored in the EEPROM at present so as to update the number of passing times SN and finds the running frequency N in the current area (N=SN/D) by dividing the updated number of passing times SN by the number of driving times D. Note that, in an initial routine to be executed by the CPU at the time when the ignition key switch (not illustrated) of the vehicle VA is changed from the OFF position to the ON position, the CPU adds "1" to the number of driving times D and stores a value obtained by the addition in the EEPROM. Further, the CPU stores the updated running frequency N in the current area in the EEPROM.

Figure 7:
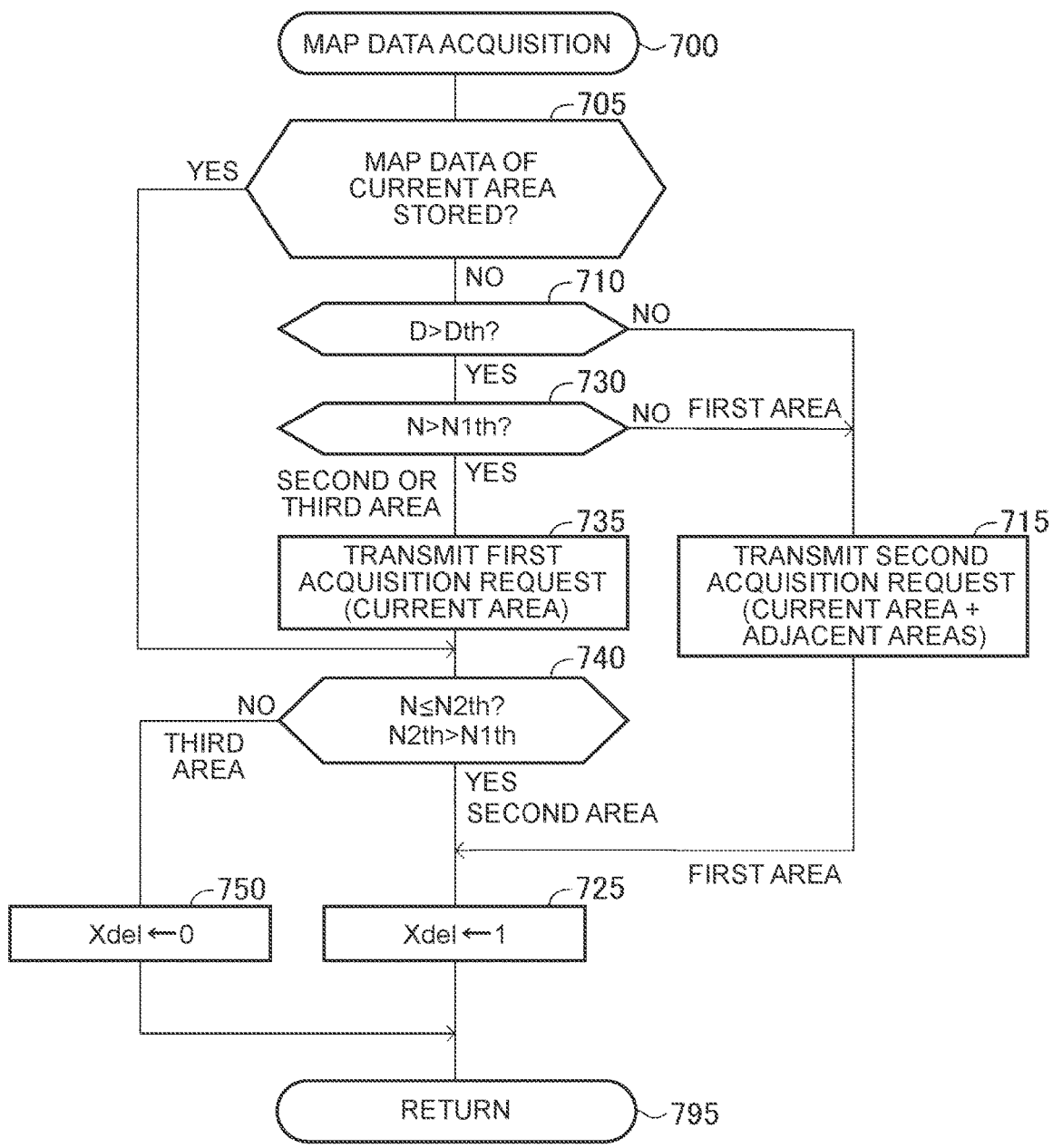
FIG. 7 is a flowchart illustrating a map data acquisition subroutine to be executed by the CPU of the control ECU illustrated in FIG. 3.

Step 625: the CPU executes a map data acquisition subroutine to acquire map data from the distribution server 20. In practice, when the CPU advances to step 625, a subroutine illustrated in the flowchart of FIG. 7 is executed. Although processes in this subroutine later will be described later in detail, the CPU transmits the first acquisition request or the second acquisition request to the distribution server 20 as needed.

Figure 9:
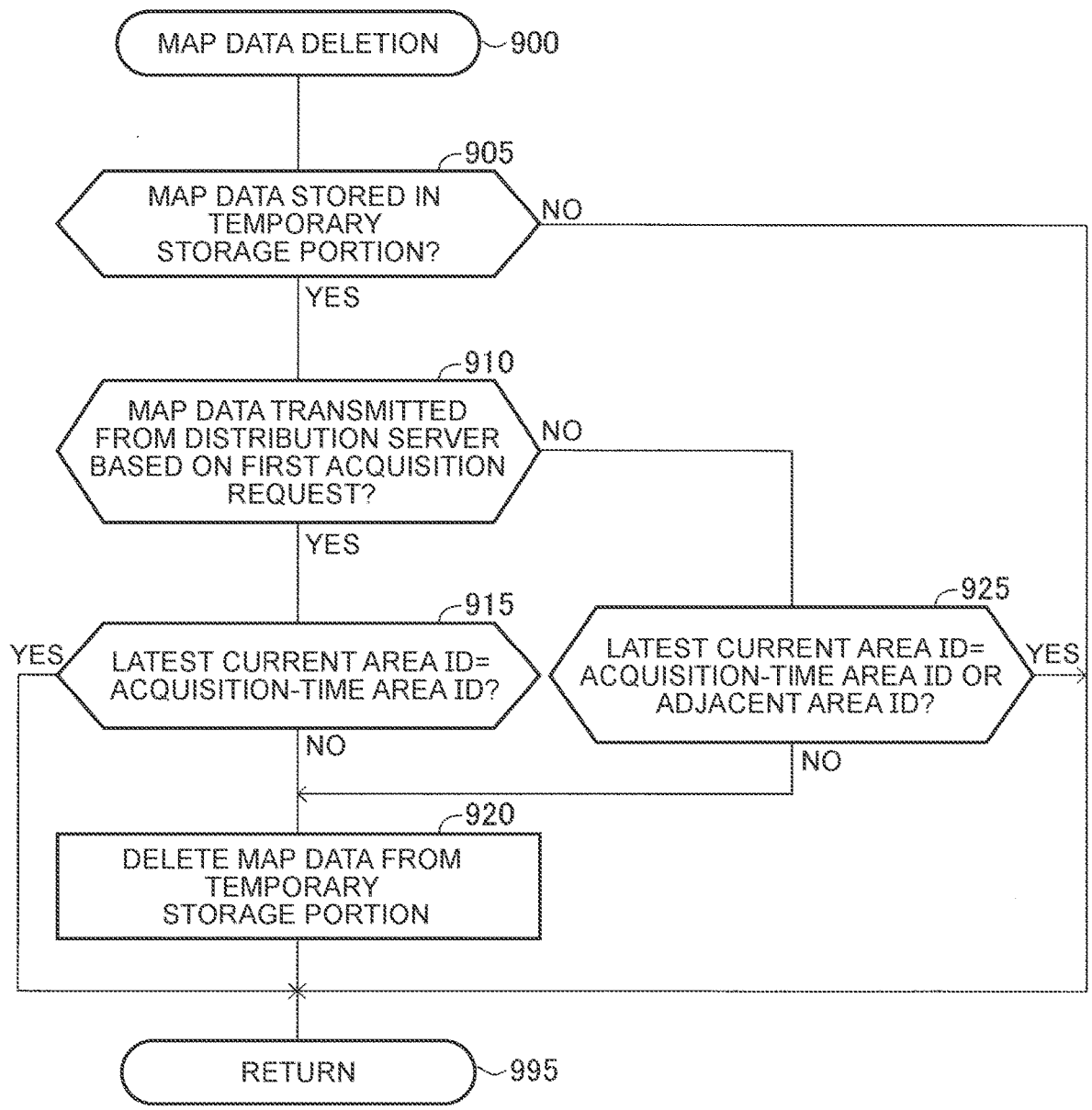
FIG. 9 is a flowchart illustrating a map data deletion subroutine to be executed by the CPU of the control ECU illustrated in FIG. 3.

Step 630: the CPU executes a map data deletion subroutine to delete map data stored in the temporary storage portion 362 when a predetermined deletion condition is established. In practice, when the CPU proceeds to step 630, the CPU executes a subroutine illustrated in the flowchart of FIG. 9. Processes in the subroutine will be also described later in detail.

Step 635: the CPU sets the latest current area ID acquired in step 610 to the previous area ID. That is, the CPU stores the latest current area ID in the RAM as the previous area ID.

After that, the CPU proceeds to step 695 and ends this routine.

In a case where the latest current area ID is the same as the previous area ID at the time when the CPU proceeds to step 615 (that is, in a case where the vehicle VA runs in the same area as an area where the routine is executed previously), the CPU determines "Yes" in step 615. The CPU proceeds directly from step 615 to step 630 and executes processes of step 630 and step 635.

Map Data Acquisition Subroutine

Figure 6:
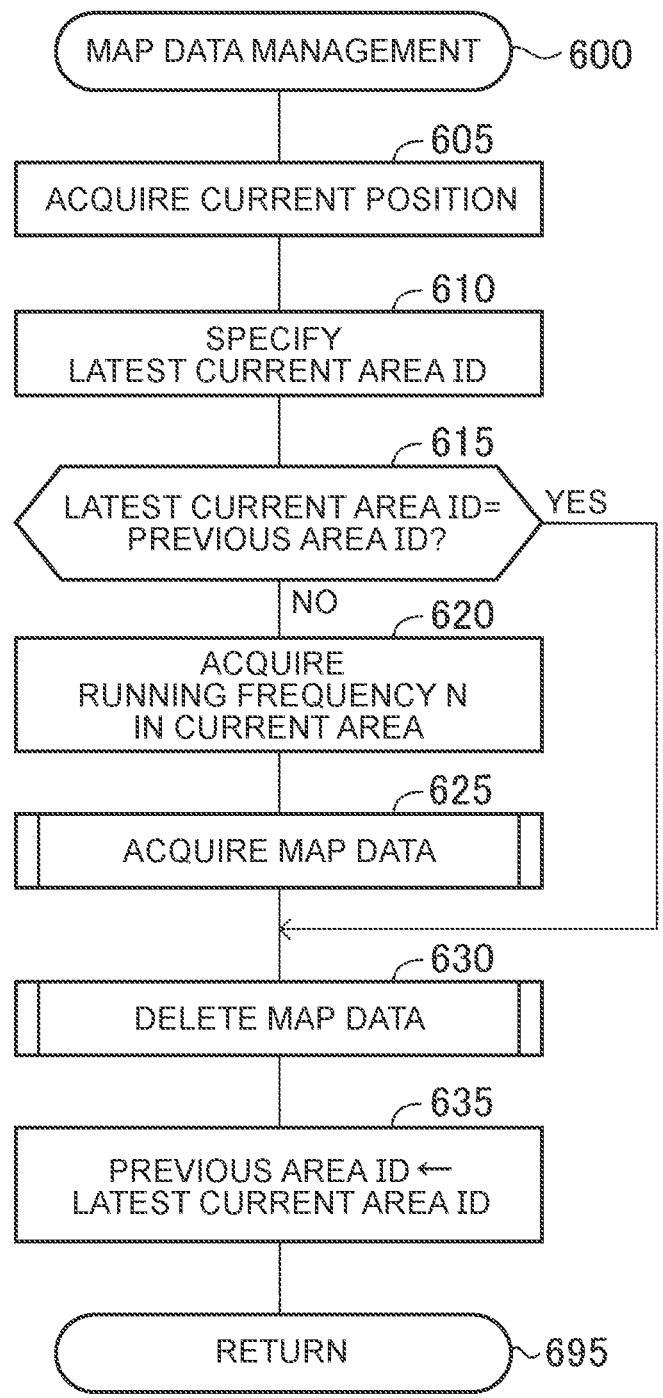
FIG. 6 is a flowchart illustrating a map data management routine to be executed by a CPU of a control ECU illustrated in FIG. 3.

When the CPU proceeds to step 625 illustrated in FIG. 6, the CPU starts the processes from step 700 illustrated in FIG. 7 and proceeds to step 705. In step 705, the CPU determines whether or not the map data of the current area is stored in either of the map data storage portion 360 and the temporary storage portion 362.

In a case where the map data of the current area is not stored in either of the map data storage portion 360 and the temporary storage portion 362, the CPU determines "No" in step 705 and proceeds to step 710. In step 710, the CPU determines whether the number of driving times D is larger than a predetermined threshold Dth or not.

In a case where the number of driving times D is the threshold Dth or less, the CPU determines "No" in step 710 and sequentially executes processes of "step 715 and step 725" described below. After that, the CPU proceeds to step 795 and ends this routine once, and then, the CPU proceeds to step 630 illustrated in FIG. 6.

Step 715: the CPU transmits the second acquisition request to the distribution server 20.

An acquisition request ID of the second acquisition request includes the following area IDS, and the second acquisition request includes a vehicle ID that is an identifier by which the vehicle VA is uniquely identifiable.

The latest current area ID as an ID of the current area

The area IDS of areas adjacent to the current area so as to surround the current area (except an area specified by the previous area ID and an area the map data of which is stored in the map data storage portion 360 or the temporary storage portion 362)

The distribution server 20 transmits, to the vehicle VA, the "map data and area IDS" corresponding to the acquisition request ID of the second acquisition request. When the vehicle VA receives these pieces of data, the vehicle VA stores the pieces of data. How to store the pieces of data will be described later.

Step 725: the CPU sets a deletion flag Xdel to "1."

Note that the deletion flag Xdel is set to "0" in the initial routine.

In a case where the number of driving times D is larger than the threshold Dth at the time when the CPU proceeds to step 710, the CPU determines "Yes" in step 710 and proceeds to step 730. In step 730, the CPU determines whether the running frequency N in the current area is larger than the first threshold N1th or not.

In a case where the running frequency N in the current area is equal to or less than the first threshold N1th (that is, in a case where the current area is the first area), the CPU determines "No" in step 730. After the CPU sequentially executes the processes of "step 715 and step 725," the CPU advances to step 630 illustrated in FIG. 6. Hereby, the CPU transmits the second acquisition request to the distribution server 20.

In the meantime, in a case where the running frequency N in the current area is larger than the first threshold N1th, the CPU determines "Yes" in step 730, and the CPU sequentially executes process of "step 735 and step 740" described below.

Step 735: the CPU transmits the first acquisition request to the distribution server 20.

The acquisition request ID of the first acquisition request is the latest current area ID, and the first acquisition request includes the vehicle ID.

The distribution server 20 transmits, to the vehicle VA, "map data and an area ID (the latest current area ID in this case)" corresponding to the acquisition request ID of the first acquisition request. When the vehicle VA receives these pieces of data, the vehicle VA stores the pieces of data. How to store the pieces of data will be described later.

Step 740: the CPU determines whether the running frequency N in the current area is equal to or less than the second threshold N2th or not.

In a case where the running frequency N in the current area is equal to or less than the second threshold N2th (that is, in a case where the current area is the second area), the CPU determines "Yes" in step 740, and the CPU proceeds to step 725 and sets the deletion flag Xdel to "1." After that, the CPU proceeds to step 795 and ends this routine once, and then, the CPU proceeds to step 630 illustrated in FIG. 6.

In the meantime, in a case where the running frequency N in the current area is larger than the second threshold N2th (that is, in a case where the current area is the third area), the CPU determines "No" in step 740, and the CPU proceeds to step 750 and sets the deletion flag Xdel to "0." After that, the CPU proceeds to step 795 and ends this routine once, and then, the CPU proceeds to step 630 illustrated in FIG. 6.

Further, in a case where the map data of the current area is stored in either of the map data storage portion 360 and the temporary storage portion 362 at the time when the CPU proceeds to step 705, the CPU determines "Yes" in step 705 and proceeds to step 740.

As described above, in a case where the map data of the current area is not stored in either of the map data storage portion 360 and the temporary storage portion 362, (1) when the current area is either the second area or the third area (step 730: Yes), the CPU transmits the first acquisition request to the distribution server 20 (step 735), and (2) when the current area is the first area (step 730: No), the CPU transmits the second acquisition request to the distribution server 20 (step 715).

Further, when the current area is either the first area or the second area, the CPU sets the deletion flag Xdel to "1" (step 725). When the current area is the third area, the CPU sets the deletion flag Xdel to "0" (step 750).

Map Data Storage Routine

Figure 8:
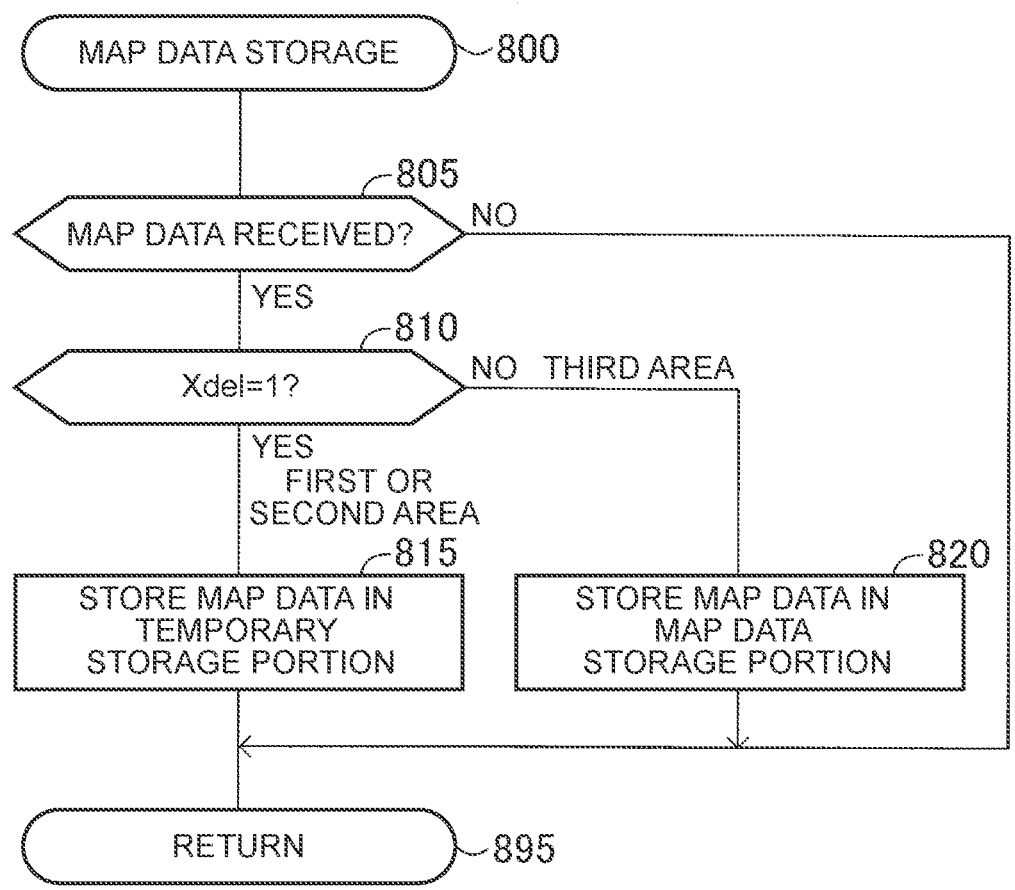
FIG. 8 is a flowchart illustrating a map data storage routine to be executed by the CPU of the control ECU illustrated in FIG. 3.

In the meantime, the CPU executes a map data storage routine illustrated in the flowchart of FIG. 8 at every predetermined time, separately from the map data management routine illustrated in FIG. 6.

Accordingly, when a predetermined timing comes, the CPU starts processes from step 800 in FIG. 8 and proceeds to step 805 in which the CPU determines whether the vehicle VA (the data communications device 38) receives map data from the distribution server 20 or not.

In a case where the vehicle VA does not receive the map data, the CPU determines "No" in step 805, and the CPU proceeds to step 895 and ends this routine once.

In a case where the vehicle VA receives the map data, the CPU determines "Yes" in step 805 and proceeds to step 810.

In step 810, the CPU determines whether the value of the deletion flag Xdel is "1" or not. As described above, when the current area is either the first area or the second area, the value of the deletion flag Xdel is set to "1," and when the current area is the third area, the value of the deletion flag Xdel is set to "0."

In a case where the value of the deletion flag Xdel is "1" (that is, in a case where the current area is either the first area or the second area), the CPU determines "Yes" in step 810. The CPU proceeds to step 815 and stores the received map data in the temporary storage portion 362. In a case where the received map data is map data (hereinafter referred to as "first map data") transmitted from the distribution server 20 in response to the first acquisition request, the CPU also stores, in the temporary storage portion 362, information indicating that the map data is the first map data. In the meantime, in a case where the received map data is map data (hereinafter referred to as "second map data") transmitted from the distribution server 20 in response to the second acquisition request, the CPU also stores, in the temporary storage portion 362, information indicating that the map data is the second map data. After that, the CPU proceeds to step 895 and ends this routine.

In the meantime, in a case where the value of the deletion flag Xdel is "0" (that is, in a case where the current area is the third area), the CPU determines "No" in step 810 and proceeds to step 820. Here, the CPU stores the received map data in the map data storage portion 360. After that, the CPU proceeds to step 895 and ends this routine.

Map Data Deletion Subroutine

The CPU deletes data stored as such in the following manner. That is, when the CPU proceeds to step 630 illustrated in FIG. 6, the CPU starts the processes from step 900 illustrated in FIG. 9 and then proceeds to step 905. In step 905, the CPU determines whether map data is stored in the temporary storage portion 362 or not.

In a case where the map data is not stored in the temporary storage portion 362, the CPU determines "No" in step 905. Then, the CPU proceeds to step 995 and ends this routine once, and after that, the CPU proceeds to step 635 illustrated in FIG. 6.

In the meantime, in a case where the map data is stored in the temporary storage portion 362, the CPU determines "Yes" in step 905 and proceeds to step 910. In step 910, the CPU determines whether the map data stored in the temporary storage portion 362 is the first map data or not.

In a case where the map data stored in the temporary storage portion 362 is the first map data, the CPU determines "Yes" in step 910 and proceeds to step 915. In step 915, the CPU determines whether the latest current area ID is the same as the area ID of the first map data stored in the temporary storage portion 362 or not. Note that the area ID of the first map data is a current area ID at the time when the first acquisition request to request acquisition of the first map data is transmitted. The current area ID at the time when the acquisition request to request acquisition of map data is referred to as an "acquisition-time area ID."

In a case where the latest current area ID is the same as the acquisition-time area ID (that is, in a case where the vehicle VA is running in an area corresponding to the first map data), the CPU determines "Yes" in step 915. Then, the CPU proceeds to step 995 and ends this routine once, and after that, the CPU proceeds to step 635 illustrated in FIG. 6.

In the meantime, in a case where the latest current area ID is different from the acquisition-time area ID (that is, in a case where the vehicle VA is running in an area different from the area corresponding to the first map data), the CPU determines "No" in step 915 and proceeds to step 920. In step 920, the CPU deletes the first map data from the temporary storage portion 362. After that, the CPU proceeds to step 995 and ends this routine once, and then the CPU proceeds to step 635 illustrated in FIG. 6.

In the meantime, in a case where the map data stored in the temporary storage portion 362 is not the first map data at the point when the CPU proceeds to step 910, the map data stored in the temporary storage portion 362 is the second map data. The second map data includes map data of the current area at the time when the second acquisition request is transmitted and pieces of map data of adjacent areas adjacent to the current area.

In a case where the map data stored in the temporary storage portion 362 is the second map data, the CPU determines "No" in step 910 and proceeds to step 925. In step 925, the CPU determines whether the latest current area ID is the same as any one of area IDS included in the second map data stored in the temporary storage portion 362 (that is, the acquisition-time area ID and adjacent area IDS of areas adjacent to the area corresponding to the acquisition-time area ID).

In a case where the latest current area ID is the same as any of the acquisition-time area ID and the adjacent area IDS, the CPU determines "Yes" in step 925. Then, the CPU proceeds to step 995 and ends this routine once, and after that, the CPU proceeds to step 635 illustrated in FIG. 6.

In the meantime, in a case where the latest current area ID is different from any of the acquisition-time area ID and the adjacent area IDS (that is, in a case where the vehicle VA enters to an "area different from the current area and its adjacent areas at the time of acquisition"), the CPU determines "No" in step 925 and proceeds to step 920 in which the CPU deletes the second map data stored in the temporary storage portion 362. After that, the CPU proceeds to step 995 and ends this routine once, and then the CPU proceeds to step 635 illustrated in FIG. 6.

Vehicle Control Routine

Figure 10:
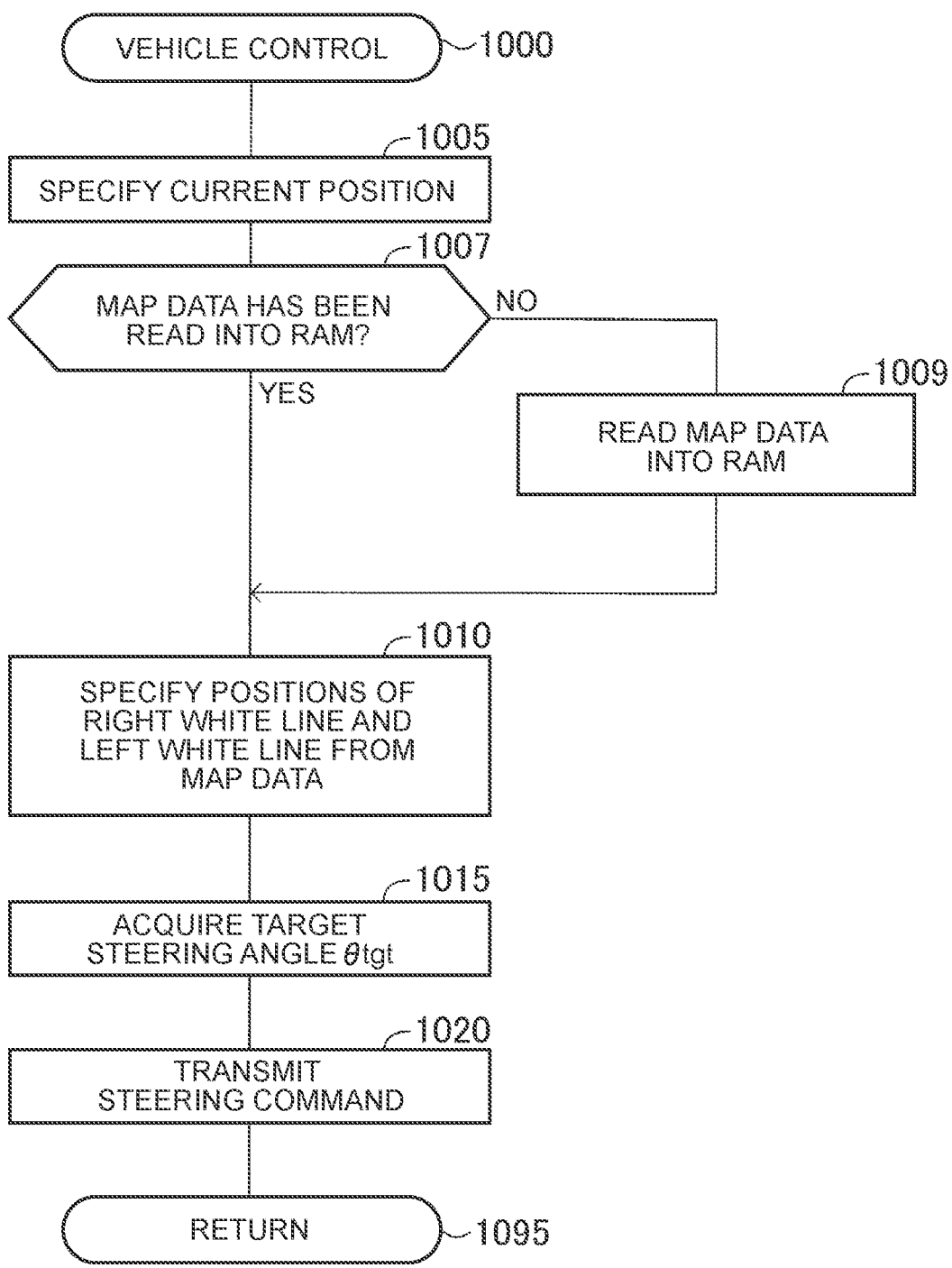
FIG. 10 is a flowchart illustrating a vehicle control routine to be executed by the CPU of the control ECU illustrated in FIG. 3.

The CPU executes a vehicle control routine illustrated in the flowchart of FIG. 10 at every predetermined time.

Accordingly, when a predetermined timing comes, the CPU starts processes from step 1000 in FIG. 10 and executes step 1005 and step 1007.

Step 1005: the CPU specifies the current position of the vehicle VA based on the GNSS signal received by the GNSS receiver 34.

Step 1007: the CPU determines whether map data of a current area corresponding to the current position has been read into the RAM or not.

In a case where the map data of the current area has not been read into the RAM, the CPU determines "No" in step 1007 and executes step 1009 to step 1020.

Step 1009: the CPU reads the map data of the current area into the RAM of the control ECU 30.

Step 1010: the CPU specifies respective positions of a right white line and a left white line that define a lane where the vehicle VA is running, based on the map data of the current area and the current position of the vehicle VA.

Step 1015: the CPU acquires a target steering angle θtgt to cause the vehicle VA to pass through a predetermined position between the right white line and the left white line.

Step 1020: the CPU transmits a steering command signal including the target steering angle θtgt to the steering ECU 60.

After that, the CPU proceeds to step 1095 and ends this routine.

In the meantime, in a case where the map data of the current area has been read into the RAM at the time when the CPU proceeds to step 1007, the CPU determines "Yes" in step 1007. The CPU executes step 1010 to step 1020. Then, the CPU proceeds to step 1095 and ends this routine once.

In the present embodiment, map data of an area the running frequency N of which is larger than the second threshold N2th is stored in the map data storage portion 360, and map data of an area the running frequency N of which is equal to or less than the second threshold N2th is stored in the temporary storage portion 362. When a deletion condition is established, the map data stored in the temporary storage portion 362 is deleted. Hereby, only map data of an area the running frequency N of which is larger than the second threshold N2th is kept stored in the storage device 36. Accordingly, it is possible to reduce the use capacity for the map data in the storage device 36, and it is also possible to reduce the communication traffic between the distribution server 20 and the vehicle VA.

In the above embodiment, a value obtained by dividing the number of passing times SN in an area by the number of driving times D is used as the running frequency N. However, the number of passing times SN in the area may be used as the running frequency N. The value to be obtained by division and the number of passing times that are usable as the running frequency N may be referred to as a "frequency index value."

The present disclosure is not limited to the above embodiment, and various modifications can be employed within the scope of the present disclosure.

First Modification

In this modification, the control ECU 30 acquires a running frequency N' of each driver of the vehicle VA by dividing the number of passing times SN' of the each driver in an area by the number of driving times D' of the each driver. The CPU of the control ECU 30 in this modification executes a map data management routine illustrated in FIG. 11 at every predetermined time instead of the map data management routine illustrated in FIG. 6. Note that, in FIG. 11, a step of performing the same process as the process of a step illustrated in FIG. 6 has the same reference sign as the reference sign used in FIG. 6, and descriptions thereof are omitted.

Figure 11:
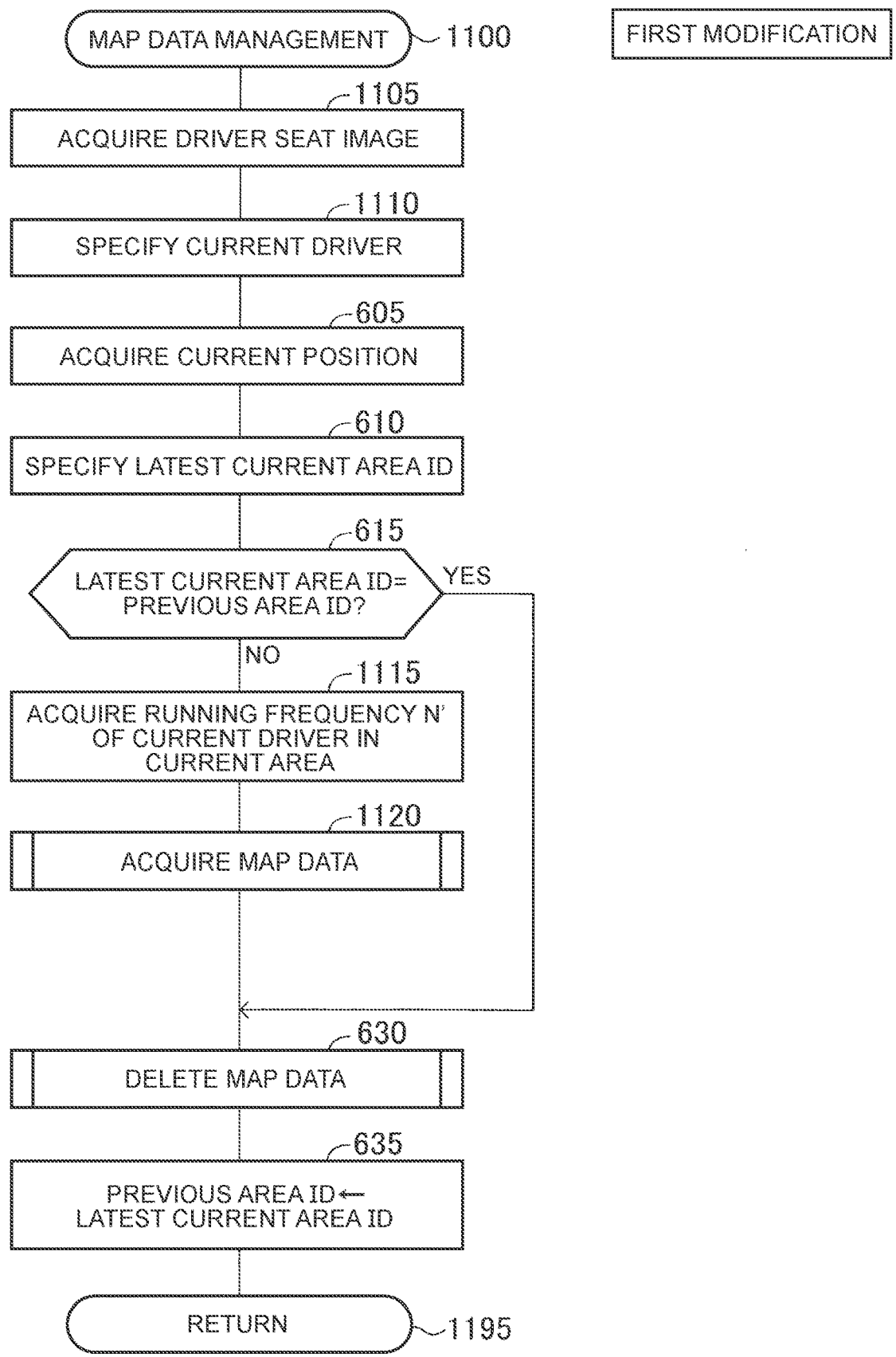
FIG. 11 is a flowchart illustrating a map data management routine of a first modification of the embodiment of the present disclosure.

When a predetermined timing comes, the CPU starts processes from step 1100 illustrated in FIG. 11 and sequentially executes step 1105 and step 1110.

Step 1105: the CPU acquires a driver seat image from the driver seat camera device 32.

Step 1110: the CPU specifies a driver (hereinafter referred to as a "current driver") currently sitting in a driver seat of the vehicle VA by comparing a facial image extracted from the driver seat image with facial images of drivers that have been registered in advance.

After that, the CPU acquires the current position in step 605 illustrated in FIG. 11 and specifies the latest current area ID in step 610 illustrated in FIG. 11. Then, the CUP proceeds to step 615 illustrated in FIG. 11.

In a case where the latest current area ID is different from the previous area ID, the CPU determines "No" in step 615 illustrated in FIG. 11 and proceeds to step 1115. In step 1115, the CPU acquires the running frequency N' of the current driver in the current area. More specifically, first, the CPU adds "1" to the "number of passing times SN' of the current driver in the current area" stored in the EEPROM at present so as to update the number of passing times SN' of the current driver, and the CPU finds the running frequency N' of the current driver in the current area (N'=SN'/D') by dividing the updated number of passing times SN' by the number of driving times D' of the current driver. Note that, in the initial routine, the CPU specifies the current driver, adds "1" to the number of driving times D' of the current driver, and stores a value obtained by the addition in the EEPROM. Further, the CPU stores the updated running frequency N' in the EEPROM.

Figure 12:
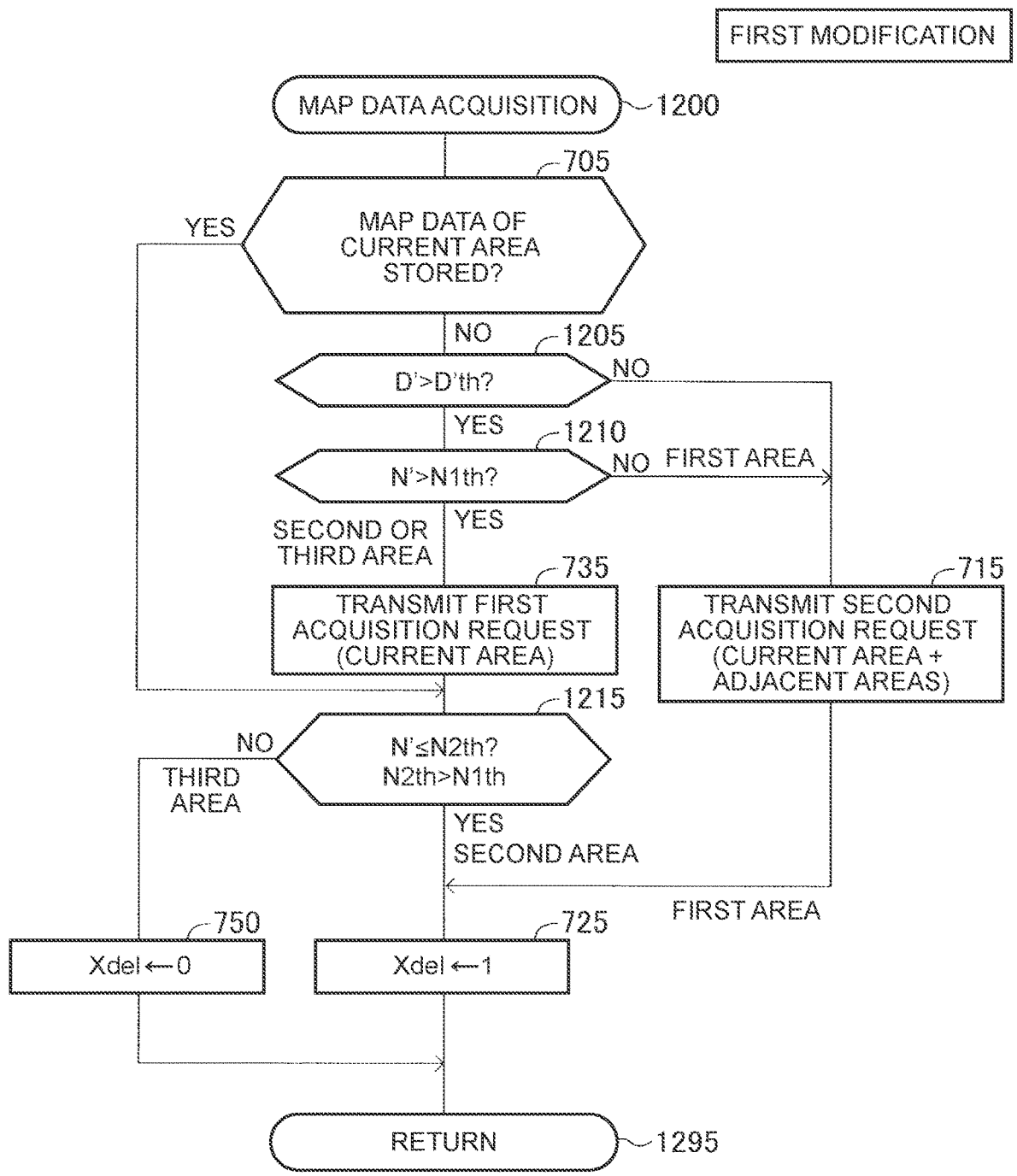
FIG. 12 is a flowchart illustrating a map data acquisition subroutine of the first modification of the embodiment of the present disclosure.

After that, in step 1120, the CPU executes a map data acquisition subroutine illustrated in FIG. 12, and then, the CPU sequentially executes "step 630 and step 635" illustrated in FIG. 11. Then, the CPU proceeds to step 1195 and ends this routine once.

When the CPU proceeds to step 1120, the CPU starts processes from step 1200 illustrated in FIG. 12. In FIG. 12, a step of performing the same process as the process of a step illustrated in FIG. 7 has the same reference sign as the reference sign used in FIG. 7, and descriptions thereof are omitted. When the CPU determines "No" in step 705 illustrated in FIG. 12, the CPU proceeds to step 1205 in which the CPU determines whether the number of driving times D' of the current driver is larger than a threshold D'th or not. It is desirable for the threshold D'th to be set to a value smaller than the threshold Dth.

In a case where the number of driving times D' of the current driver is larger than the threshold D'th, the CPU determines "Yes" in step 1205 and proceeds to step 1210 in which the CPU determines whether the running frequency N' of the current driver in the current area is larger than the first threshold N1th or not. In a case where the running frequency N' in the current area is larger than the first threshold N1th, the CPU determines "Yes" in step 1210, and then, the CPU executes step 735 illustrated in FIG. 12 and proceeds to step 1215.

In step 1215, the CPU determines whether the running frequency N' of the current driver in the current area is equal to or less than the second threshold N2th or not. In a case where the running frequency N' of the current driver in the current area is the second threshold N2th or less, the CPU determines "Yes" in step 1215, and then, the CPU executes step 725 illustrated in FIG. 12. After that, the CPU proceeds to step 1295 and ends this routine once, and then, the CPU proceeds to step 635 illustrated in FIG. 11. In the meantime, in a case where the running frequency N' of the current driver in the current area is larger than the second threshold N2th, the CPU determines "No" in step 1215, and then, the CPU executes step 750 illustrated in FIG. 11. After that, the CPU proceeds to step 1295 and ends this routine once, and then, the CPU proceeds to step 635 illustrated in FIG. 11.

In a case where the number of driving times D' of the current driver is the threshold D'th or less, the CPU determines "No" in step 1205 and executes "step 715 and step 725" illustrated in FIG. 12. In a case where the running frequency N' of the current driver in the current area is the first threshold N1th or less, the CPU determines "No" in step 1210 and executes "step 715 and step 725" illustrated in FIG. 12. When the CPU determines "Yes" in step 705 illustrated in FIG. 12, the CPU proceeds to step 1215.

In the present modification, the running frequency N' in the current area that is acquired for each driver is compared with the second threshold N2th, and therefore, it is possible to determine whether the map data is stored or deleted, based on the running frequency N' of the each driver in the current area.

Further, since the running frequency N' is compared with the first threshold N1th, either of the first acquisition request and the second acquisition request is transmitted in accordance with the running frequency N'. Hereby, the number to pieces of map data to be acquired from the distribution server 20 can be determined in accordance with the running frequency N' of each driver.

Note that the first threshold N1th and the second threshold N2th to be used in the present modification may be set to respective values different from the first threshold N1th and the second threshold N2th to be used in the above embodiment.

The CPU specifies the current driver based on the driver seat image. However, the present disclosure is not limited to this. For example, the CPU may specify the current driver by use of any of a smartphone, an electronic key, a fingerprint, and so on of the driver.

In the present modification, the number of passing times SN' of each driver in an area may be used as the running frequency N' of the each driver in the area. In this case, the first threshold N1th and the second threshold N2th are set to be larger as the number of driving times D' of the driver is larger.

Second Modification

In the present modification, the control ECU 30 acquires the running frequency N' of each driver in the current area and the running frequency N of the vehicle VA in the current area. When the running frequency N' is larger than the first threshold N1th, the control ECU 30 transmits the first acquisition request, and when the running frequency N' is equal to or less than the first threshold N1th, the control ECU 30 transmits the second acquisition request. Further, when the running frequency N of the vehicle VA in the current area that does not depend on drivers is larger than the second threshold N2th, the control ECU 30 stores map data transmitted from the distribution server 20 in the map data storage portion 360, and when the running frequency N is equal to or less than the second threshold N2th, the control ECU 30 stores the map data in the temporary storage portion 362.

Figure 13:
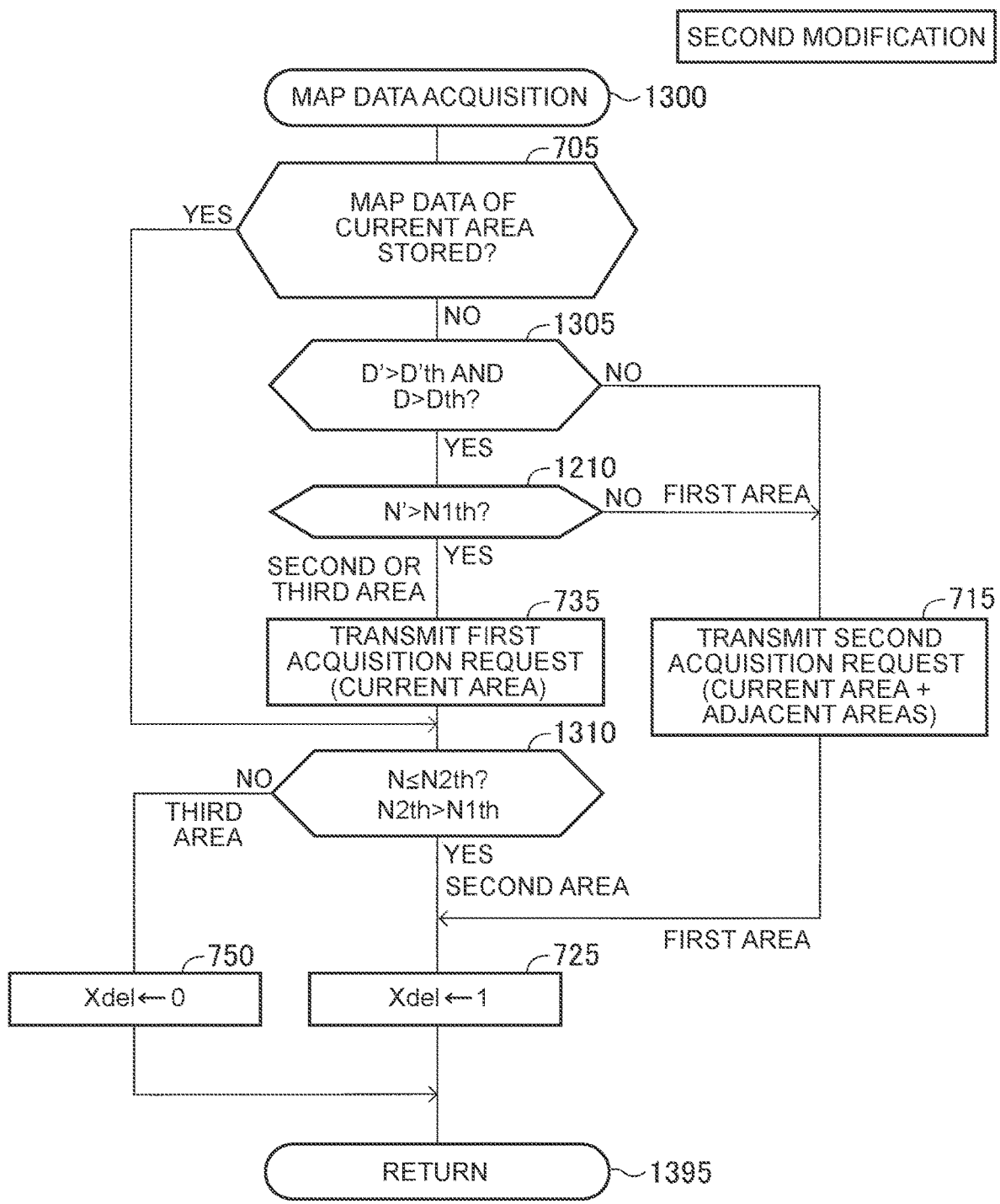
FIG. 13 is a flowchart illustrating a map data acquisition subroutine of a second modification of the embodiment of the present disclosure.

The CPU of the present modification executes the map data management routine illustrated in FIG. 11. In step 1115, the CPU acquires the running frequency N' and the running frequency N. After that, in a case where the CPU proceeds to step 1120 illustrated in FIG. 11, the CPU executes a map data management routine illustrated in FIG. 13. In FIG. 13, a step of performing the same process as the process of a step illustrated in FIG. 7 or 12 has the same reference sign as the reference sign used in FIG. 7 or 12, and descriptions thereof are omitted.

Accordingly, when the CPU proceeds to step 1120 illustrated in FIG. 11, the CPU starts processes from step 1300 illustrated in FIG. 13. The CPU determines "No" in step 705 illustrated in FIG. 13 and proceeds to step 1305. In step 1305, the CPU determines whether or not the number of driving times D' of the current driver is larger than the threshold D'th and the number of driving times D of the vehicle VA that does not depend on drivers is larger than the threshold Dth.

In a case where the number of driving times D' is larger than the threshold D'th and the number of driving times D is larger than the threshold Dth, the CPU determines "Yes" in step 1305 and proceeds to step 1210 illustrated in FIG. 13. When the CPU determines "Yes" in step 1210 illustrated in FIG. 13, the CPU executes step 735 illustrated in FIG. 13 and proceeds to step 1310.

In step 1310, the CPU determines whether or not the running frequency N of the vehicle VA in the current area that does not depend on drivers is equal to or less than the second threshold N2th. When the running frequency N is equal to or less than the second threshold N2th, the CPU determines "Yes" in step 1310, and then, the CPU executes step 725 illustrated in FIG. 13. After that, the CPU proceeds to step 1395 and ends this routine once, and then, the CPU proceeds to step 635 illustrated in FIG. 11. In the meantime, when the running frequency N is larger than the second threshold N2th, the CPU determines "No" in step 1310, and then, the CPU executes step 750 illustrated in FIG. 13. After that, the CPU proceeds to step 1395 and ends this routine once, and then, the CPU proceeds to step 635 illustrated in FIG. 11.

In the meantime, in a case where the number of driving times D' is equal to or less than the threshold D'th or the number of driving times D is equal to or less than the threshold Dth at the point when the CPU proceeds to step 1305, the CPU determines "No" in step 1305. In a case where the CPU determines "No" in step 1305 or in a case where the CPU determines "No" in step 1210 illustrated in FIG. 13, the CPU executes "step 715 and step 725" illustrated in FIG. 13. After that, the CPU proceeds to step 1395 and ends this routine once, and then, the CPU proceeds to step 635 illustrated in FIG. 11.

In the present modification, the running frequency N in the current area is compared with the second threshold N2th, and therefore, it is possible to determine whether the map data is stored or deleted in accordance with the running frequency N of the vehicle VA regardless of drivers.

Further, since the running frequency N' of each driver is compared with the first threshold N1th, either of the first acquisition request and the second acquisition request is transmitted in accordance with the running frequency N'. Hereby, the number to pieces of map data to be acquired from the distribution server 20 can be determined in accordance with the running frequency N' of each driver.

Third Modification

The distribution server 20 may manage the running frequency N of the vehicle VA in each area and may transmit, to the vehicle VA, map data including an instruction to delete the map data or store the map data in the map data storage portion 360 in accordance with the running frequency N of the vehicle VA.

More specifically, the vehicle VA transmits the "vehicle ID as an identifier of the vehicle VA" and position information including the current position to the distribution server 20 at every predetermined time. Note that, in a case where map data of the current position is not stored in the storage device 36, the vehicle VA transmits the position information together with an acquisition request.

When the distribution server 20 acquires the position information, the distribution server 20 specifies a current area ID corresponding to the current position as the latest current area ID. When the latest current area ID is different from the previous area ID, the distribution server 20 updates the running frequency N of the current area. Further, in a case where the position information includes the acquisition request, when the running frequency N, in the current area, of the vehicle VA transmitting the position information is equal to or less than the first threshold N1th, the distribution server 20 transmits pieces of map data of the current area and its adjacent areas. Note that this map data includes storage prohibition information.

In the meantime, in a case where the running frequency N, in the current area, of the vehicle VA transmitting the position information is larger than the first threshold N1th, when the running frequency N is larger than the second threshold N2th, the distribution server 20 transmits the map data together with storage permission information, but when the running frequency N is equal to or less than the second threshold N2th, the distribution server 20 transmits the map data together with the storage prohibition information.

In a case where the vehicle VA receives the map data including the storage prohibition information, the vehicle VA stores the map data in the temporary storage portion 362. When a predetermined deletion threshold time passes from the point (the point of storage) when the vehicle VA has stored the map data in the temporary storage portion 362, the vehicle VA determines that the deletion condition is established, and the vehicle VA deletes the map data from the temporary storage portion 362. In the meantime, in a case where the vehicle VA receives the map data including the storage permission information, the vehicle VA stores the map data in the map data storage portion 360.

The present modification is also applicable to the first modification and the second modification. In this case, the vehicle VA transmits a driver ID that is an identifier of a driver who is currently driving the vehicle VA, as well as the position information. Hereby, the distribution server 20 can manage the running frequency N of each driver in each area.

Fourth Modification

The deletion condition is not limited to the above example and may be any of the following conditions.

A condition that a deletion threshold time passes from the point of storage when the map data is stored in the temporary storage portion 362.

A condition that a predetermined time passes from the point when the vehicle VA enters an area different from an area at the time when the vehicle VA transmits any acquisition request.

A condition that the ignition key switch is changed from the ON position to the OFF position.

A condition that the capacity of the map data stored in the temporary storage portion 362 reaches a threshold or more.

A condition that the vehicle control is terminated by the operation performed by the driver.

Fifth Modification

In the above embodiment, the map data to be deleted is stored in the temporary storage portion 362 of the storage device 36, but the map data to be deleted may be stored in the RAM of the control ECU 30.

Sixth Modification

The CPU may execute a control by which the map data of the current area is displayed on a display (not illustrated) as the vehicle control.

In the above embodiment, the current position of the vehicle VA is specified based on the GNSS signal, but the present disclosure is not limited to this. For example, the CPU may specify the current position of the vehicle VA based on a speed (vehicle speed) Vs of the vehicle VA and the steering angle θ. Note that the vehicle speed Vs is specified by a detection signal from a wheel speed sensor that can detect the rotation speed of wheels (not illustrated) of the vehicle VA.

The vehicle VA may be an engine vehicle driven by an engine, an electric vehicle, or a hybrid vehicle.

What is claimed is:

1. A map data usage system comprising:
a map data distribution server configured to transmit map data of each of a plurality of areas having a predetermined magnitude; and
a vehicle including a storage device in which the map data transmitted from the map data distribution server via a network is stored, the storage device having a storage capacity and comprising a temporary storage portion and a map data storage portion, a position acquisition device configured to acquire a current position, and a control device configured to execute a predetermined vehicle control by use of the map data stored in the storage device, wherein:
in a case where the map data distribution server receives a first acquisition request or a second acquisition request for map data that is transmitted from the vehicle, the map data distribution server is configured to transmit, to the vehicle, map data of an area corresponding to the acquisition request thus received; and
the control device is configured to:
acquire a first frequency index value of each of a plurality of drivers in a current area corresponding to a current position of the vehicle, and a second frequency index value of the vehicle in the current area;
transmit the first acquisition request for acquiring map data of a first area when the first frequency index value is equal to or less than a first threshold and the second acquisition request for acquiring map data of a second area or a third area when the first frequency index value is larger than the first threshold;
determine, in a case where the control device transmits the second acquisition request, that the current area is the second area when the second frequency index value is equal to or less than a second threshold, and that the current area is the third area when the second frequency index value is larger than the second threshold;
the control device is further configured such that,
in a case where, among the areas, map data of an area to which the current position of the vehicle belongs is not stored in the storage device, the map data being acquired by the position acquisition device, the control device transmits, to the map data distribution server as the first acquisition request or the second acquisition request, a request to acquire map data of an acquisition area including at least the area to which the current position of the vehicle belongs,
the control device receives the map data of the acquisition area that is transmitted from the map data distribution server in response to the acquisition request and then stores the map data in the storage device,
in a case where a second frequency index value indicative of how frequently the vehicle runs in an area to which a position of the vehicle at a time of transmission of the first acquisition request or second acquisition request belongs is equal to or less than a predetermined deletion threshold, the control device stores the map data in the temporary storage portion, and when a predetermined deletion condition is established, the control device deletes the map data of the acquisition area from the temporary storage portion, and
in a case where the second frequency index value in the area to which the position of the vehicle at the time of transmission of the first acquisition request or second acquisition request belongs is larger than the deletion threshold, the control device stores the map data in the map data storage portion, and the control device maintains the map data of the acquisition area to be stored without deleting the map data of the acquisition area from the map data storage portion regardless of whether the deletion condition is established or not;
wherein the predetermined deletion condition comprises a size of the map data stored in the storage device equals or exceeds a predetermined portion of the storage capacity of the storage device.

2. The map data usage system according to claim 1, wherein:

in a case where a second frequency index value in the area to which the current position of the vehicle belongs is larger than a predetermined acquisition threshold, the control device transmits, to the map data distribution server as the acquisition request, the first acquisition request that is a request to acquire the map data of the area to which the current position of the vehicle belongs; and in a case where the second frequency index value in the area to which the current position of the vehicle belongs is equal to or less than the acquisition threshold, the control device transmits, to the map data distribution server as the acquisition request, the second acquisition request to acquire the map data of the area to which the current position of the vehicle belongs and map data of an area adjacent to the area to which the current position of the vehicle belongs.

3. The map data usage system according to claim 2, wherein, in a case where the second frequency index value in the area to which the position of the vehicle at the time of transmission of the acquisition request belongs is equal to or less than the predetermined deletion threshold, the control device is configured such that:

when the area to which the current position of the vehicle belongs becomes different from an area to which the position of the vehicle at a time of transmission of the first acquisition request belongs, the control device determines that the predetermined deletion condition is established, and the control device deletes, from the storage device, the map data transmitted from the map data distribution server in response to the first acquisition request; and when the area to which the current position of the vehicle belongs becomes different from either of an area to which the position of the vehicle at a time of transmission of the second acquisition request belongs and an area adjacent to the area to which the position of the vehicle at the time of transmission of the second acquisition request belongs, the control device determines that the predetermined deletion condition is established, and the control device deletes, from the storage device, the map data transmitted from the map data distribution server in response to the second acquisition request.

4. The map data usage system according to claim 1, wherein either the number of passing times as the number of times the vehicle passes the area in a predetermined period or a ratio of the number of passing times to the number of driving times of the vehicle in the predetermined period is acquired as the frequency index value.

5. The map data usage system according to claim 1, wherein either the number of passing times as the number of times the vehicle driven by a current driver who is a driver driving the vehicle at present passes through the area in a predetermined period or a ratio of the number of passing times to the number of driving times of the vehicle by the current driver in the predetermined period is acquired as the frequency index value.

6. The map data usage system according to claim 1, wherein:

a ratio of the number of passing times as the number of times the vehicle driven by a current driver who is a driver driving the vehicle at present passes through the area in a predetermined period to the number of driving times of the vehicle by the current driver in the predetermined period is acquired as a first frequency index value;

a ratio to the number of passing times as the number of times the vehicle passes through the area in the predetermined period regardless of drivers of the vehicle to the number of driving times of the vehicle in the predetermined period regardless of drivers is acquired as a second frequency index value;

in a case where the first frequency index value in the area to which the current position of the vehicle belongs is larger than the predetermined acquisition threshold, the control device transmits, to the map data distribution server as the acquisition request, a first acquisition request to acquire the map data of the area to which the current position of the vehicle belongs;

in a case where the first frequency index value of the area to which the current position of the vehicle belongs is equal to or less than the acquisition threshold, the control device transmits, to the map data distribution server as the acquisition request, a second acquisition request to acquire the map data of the area to which the current position of the vehicle belongs and map data of an area adjacent to the area to which the current position of the vehicle belongs;

in a case where the second frequency index value of the area to which the position of the vehicle at the time of transmission of the acquisition request belongs is equal to or less than the deletion threshold, when the deletion condition is established, the control device deletes the map data of the acquisition area from the storage device; and in a case where the second frequency index value of the area to which the position of the vehicle at the time of transmission of the acquisition request belongs is larger than the deletion threshold, the control device maintains the map data of the acquisition area to be stored.

7. A map data usage method for executing a predetermined vehicle control by use of map data stored in a storage device of a vehicle, the storage device having a storage capacity and comprising a temporary storage portion and a map data storage portion, the map data being transmitted via a network from a map data distribution server in which map data of each of a plurality of areas having a predetermined magnitude is stored, the map data usage method comprising:

a first step of acquiring a first frequency index value of each of a plurality of drivers in a current area corresponding to a current position of the vehicle, and a second frequency index value of the vehicle in the current area a second step of, in a case where map data of an area to which a current position of the vehicle belongs is not stored in the storage device, transmitting, to the map data distribution server, a first acquisition request to acquire map data of a first area including at least the area to which the current position of the vehicle belongs when the first frequency index value is equal to or less than a first threshold and a second acquisition request to acquire map data of a second area or a third area when the first frequency index value is larger than the first threshold;

a third step of determining, in a case where the second acquisition request is transmitted, that the current area is the second area when the second frequency index value is equal to or less than a second threshold, and that the current area is the third area when the second frequency index value is larger than the second threshold;

a fourth step of receiving the map data of the acquisition area that is transmitted from the map data distribution server in response to the request and storing the map data in the storage device;

a fifth step of, in a case where the second frequency index value indicative of how frequently the vehicle runs in an area to which a position of the vehicle at a time of transmission of the request belongs is equal to or less than a predetermined deletion threshold, storing the map data in the temporary storage portion, and deleting the map data of the acquisition area from the temporary storage portion when a predetermined deletion condition is established; and a sixth step of, in a case where the second frequency index value in the area to which the position of the vehicle at the time of transmission of the request belongs is larger than the deletion threshold, storing the map data in the map data storage portion, and maintaining the map data of the acquisition area to be stored without deleting the map data of the acquisition area from the map data storage portion the regardless of whether the deletion condition is established or not;

wherein the predetermined deletion condition comprises a size of the map data stored in the storage device equals or exceeds a predetermined portion of the storage capacity of the storage device.

8. A vehicle comprising:

a storage device having a storage capacity and configured to store map data used in a navigation system, the storage device comprising a temporary storage portion and a map data storage portion; and a control device configured to:

acquire a first frequency of each of a plurality of drivers in a current area corresponding to a current position of the vehicle, and a second frequency of the vehicle in the current area;

in a case where map data of an area to which a current position of the vehicle belongs is not stored in the storage device, transmitting, to the map data distribution server, a first acquisition request to acquire map data of a first area including at least the area to which the current position of the vehicle belongs when the first frequency is equal to or less than a first threshold and a second acquisition request to acquire map data of a second area or a third area when the first frequency is larger than the first threshold;

determine, in a case where the second acquisition request is transmitted, that the current area is the second area when the second frequency index value is equal to or less than a second threshold, and that the current area is the third area when the second frequency index value is larger than the second threshold;

download, from a server, first map data that is map data of a first area, and when the second frequency with which the vehicle runs in the first area is equal to or less than a predetermined threshold, set a first predetermined value and store the first map data in the temporary storage portion based on the first predetermined value;

when the second frequency with which the vehicle runs in the first area is larger than the predetermined threshold, set a second predetermined value and store the first map data in the map data storage portion based on the second predetermined value; and when determining that a free space on said storage device is below a threshold portion of said storage capacity, delete the first map data from the temporary storage portion.

9. The vehicle of claim 8, wherein the control device is further configured to delete the first map data when a deletion threshold time has passed from a point of time of storage of the map data.

10. The vehicle of claim 8, wherein the control device is further configured to delete the first map data when an ignition key is switched from an ON position to an OFF position.

11. The vehicle of claim 8, wherein the control device is further configured to delete the first map data when vehicle control is terminated by an operation performed by a driver.

* * * * *